US008956103B2

(12) United States Patent
Gehring

(10) Patent No.: US 8,956,103 B2
(45) Date of Patent: Feb. 17, 2015

(54) HYDROELECTRICITY GENERATING UNIT CAPTURING MARINE WAVE ENERGY AND MARINE CURRENT ENERGY

(71) Applicant: Donald H. Gehring, Houston, TX (US)

(72) Inventor: Donald H. Gehring, Houston, TX (US)

( * ) Notice: Subject to any disclaimer, the term of this patent is extended or adjusted under 35 U.S.C. 154(b) by 0 days.

(21) Appl. No.: 13/901,371

(22) Filed: May 23, 2013

(65) Prior Publication Data

US 2013/0313831 A1    Nov. 28, 2013

Related U.S. Application Data

(60) Provisional application No. 61/650,892, filed on May 23, 2012.

(51) Int. Cl.
*F03B 13/00* (2006.01)
*F03B 13/10* (2006.01)
*F03B 17/06* (2006.01)

(52) U.S. Cl.
CPC .............. *F03B 13/10* (2013.01); *F03B 17/061* (2013.01); *F05B 2240/40* (2013.01); *Y02E 10/28* (2013.01)
USPC ........................................................... 415/7

(58) Field of Classification Search
CPC ................................. F03B 13/00; F03B 13/10
USPC .............................................. 415/7; 290/54
See application file for complete search history.

(56) References Cited

U.S. PATENT DOCUMENTS

| | | | | |
|---|---|---|---|---|
| 2,501,696 A | * | 3/1950 | Souczek | 290/43 |
| 3,986,787 A | * | 10/1976 | Mouton et al. | 415/7 |
| 4,383,182 A | * | 5/1983 | Bowley | 290/43 |
| 6,091,161 A | * | 7/2000 | Dehlsen et al. | 290/43 |
| 6,856,036 B2 | * | 2/2005 | Belinsky | 290/42 |
| 7,215,036 B1 | * | 5/2007 | Gehring | 290/54 |
| 7,352,078 B2 | * | 4/2008 | Gehring | 290/54 |
| 2005/0285407 A1 | * | 12/2005 | Davis et al. | 290/54 |
| 2006/0232075 A1 | * | 10/2006 | Fraenkel | 290/54 |
| 2006/0261597 A1 | * | 11/2006 | Gehring | 290/44 |
| 2007/0231072 A1 | * | 10/2007 | Jennings et al. | 405/75 |
| 2010/0164230 A1 | * | 7/2010 | Belinsky et al. | 290/54 |
| 2013/0000541 A1 | * | 1/2013 | Rijken et al. | 114/265 |

FOREIGN PATENT DOCUMENTS

| | | | | | |
|---|---|---|---|---|---|
| GB | 2383978 A | * | 7/2003 | | B63B 35/44 |
| GB | 2434410 A | * | 7/2007 | | B63B 35/44 |
| GB | 2441821 A | * | 3/2008 | | F03B 13/18 |
| GB | 2441822 A | * | 3/2008 | | F03B 13/26 |
| GB | 2447774 A | * | 9/2008 | | F03B 17/06 |

* cited by examiner

Primary Examiner — Joseph Waks

(57) ABSTRACT

A hydroelectricity generating unit capturing marine wave energy and marine current energy is completed with a buoyant floating frame, a plurality of electric generating pontoons, and a floating frame mooring system. The buoyant floating frame is positioned underneath water and connected with a seabed by the floating frame mooring system and connected with the plurality of electric generating pontoons by a plurality of pontoon mooring systems. The buoyant floating frame includes marine current electric generating units which are rotatably connected within the buoyant floating frame and utilize the marine current energy to produce electricity. The plurality of electric generating pontoons also produces additional electricity by the flowing marine wave energy and marine current energy. A power farm can be constructed with multiple hydroelectricity generating units, where the multiple hydroelectricity generating units are interconnected with each other through a horizontal mooring system in order to provide additional stability.

12 Claims, 22 Drawing Sheets

DETAIL D
SCALE 1 : 1.5

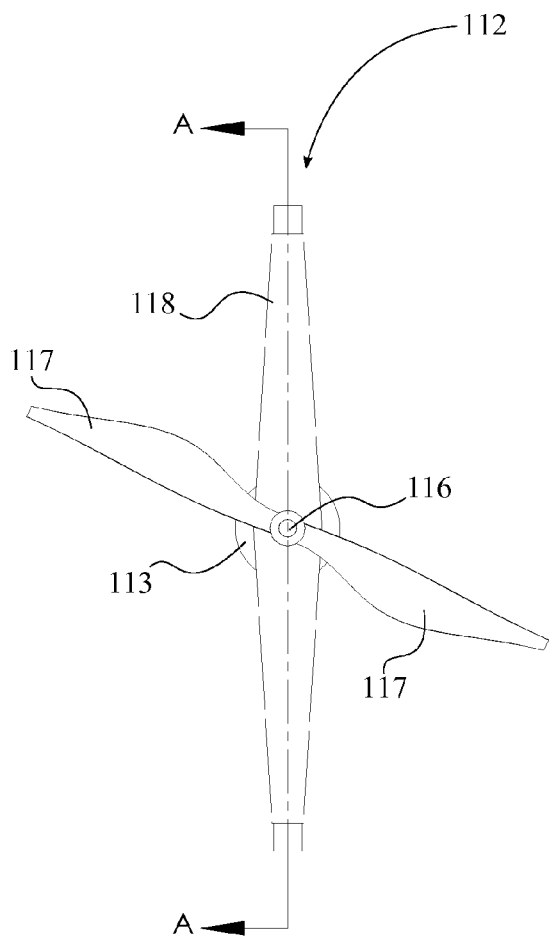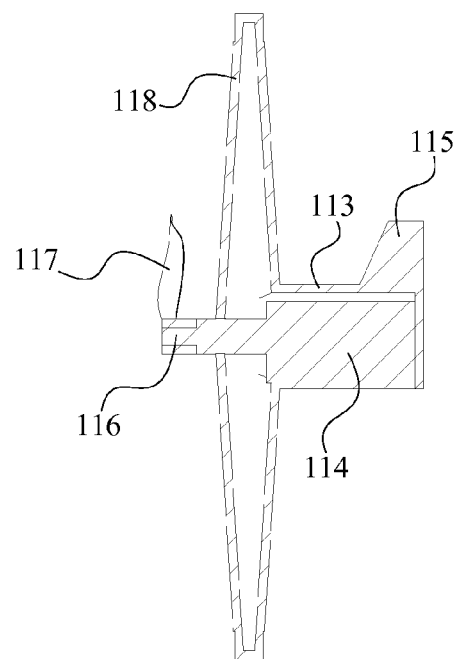
SECTION A-A
SCALE 1 : 1
FIG. 12
FIG. 13

HYDROELECTRICITY GENERATING UNIT CAPTURING MARINE WAVE ENERGY AND MARINE CURRENT ENERGY

The current application claims a priority to the U.S. Provisional Patent application Ser. No. 61/650,892 filed on May 23, 2012.

FIELD OF THE INVENTION

The present invention relates generally to power generation, and more specifically to support frames for supporting underwater current generators which utilize turbines turned by marine currents to generate power.

BACKGROUND OF THE INVENTION

As technology and industry in the modern world continues to grow and expand, so do the power requirements. Many different sources of power generation exist today involving: fossil fuel burning, solar, wind, geothermal, hydroelectric, wave and current power generation, etc. Hydroelectric, wave and current power generation use the movement of water to generate power. The majority of the planet is covered in water, most of which is constantly moving. This moving water power can be harnessed and converted to electrical energy through apparatuses which take advantage of the electromagnetic phenomenon known as Faraday's law, which states that an electromotive force is produced by moving an electrical conductor through a magnetic field. Essentially, moving water is free energy waiting to be captured and utilized. Hydroelectric generation accounts for around 15 to 20 percent of the world's electricity generation, mostly from dams such as the Hoover Dam, which utilize the gravitational force of falling water to generate electricity. Hydroelectricity is a valuable source of energy since it is renewable; it has a low cost and produces significantly less waste since it does not require hydrocarbons to be burned. A study funded by the European Commission found that hydroelectricity produces the least amount of greenhouse gases and externalities.

Another method of hydroelectric generation is to utilize the movement of marine currents. Marine currents are driven by the tides, wind, solar heating, and occasionally variations in water density and salinity. Marine currents in tidal estuaries are usually bi-directional and change direction 180 degrees with the tide cycles, and are an excellent potential source of hydroelectric generation. Marine currents in the open ocean are also influenced by the tide cycles and often have a predominant bi-directional heading but other influences make them multi-directional as well. In some areas of the open ocean, the currents are almost always uni-directional and are often high velocity. These areas are often found between land masses. Many of these areas of high velocity often have uni-directional current and are sometimes near large population centers making the transmission of the power to the population centers very efficient as well. According to a 2006 white paper by the U.S. Department of the Interior, a 12-mph water flow contains about the same energy as a 110-mph air flow. This makes ocean currents a promising new source of hydroelectric power which is largely untapped and virtually unlimited in potential.

It is therefore an objective of the present invention to provide a modular support frame for marine current generators that harness marine currents which can be installed globally in varying water depths from shallow to deep using a variety of methods. Additional hydroelectric generating devices are also connected with the modular support frame to maximize the power output of the present invention.

BRIEF DESCRIPTION OF THE DRAWINGS

FIG. 12 is a front view of the marine current electric generator unit of the present invention, showing a plane upon which a cross sectional view is taken shown in FIG. 13.

FIG. 13 is a cross sectional view of the marine current electric generator unit of the present invention taken along the line A-A of FIG. 12.

DETAIL DESCRIPTIONS OF THE INVENTION

All illustrations of the drawings are for the purpose of describing selected versions of the present invention and are not intended to limit the scope of the present invention.

Figure 1:
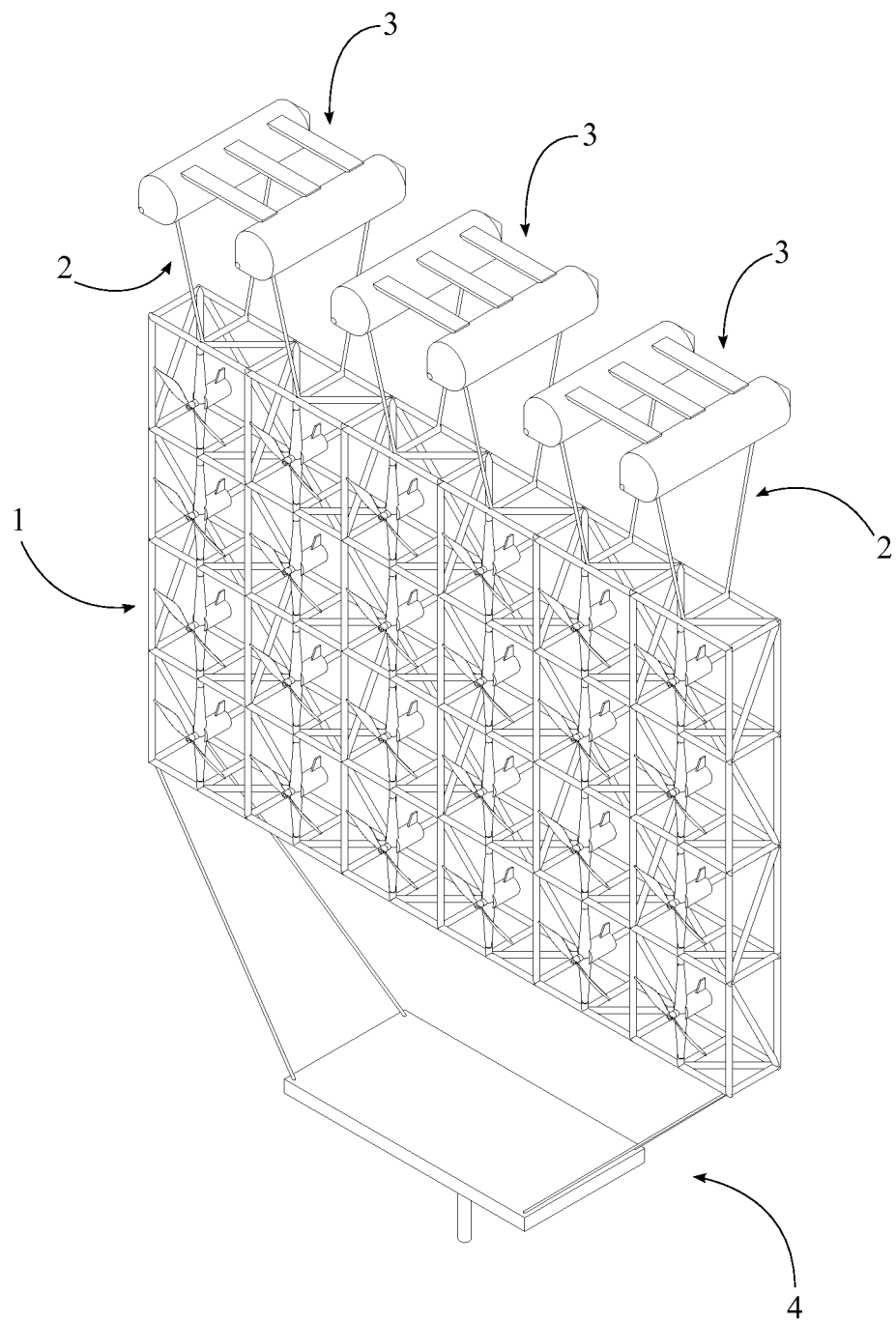
FIG. 1 is a perspective view of the present invention.

The present invention, a hydroelectric generating unit, is an apparatus for generating hydroelectricity from marine wave energy and marine current energy. In reference to FIG. 1, the present invention comprises a buoyant floating frame 1, a plurality of electric generator pontoons 3, and a floating frame mooring system 4. The present invention is able to harvest energy from a marine environment and converts the harvested energy into electricity, where the electricity can be exported through power cables from the present invention and distributed through an electrical substation in a similar manner as the electric power is exported from the traditional turbine generators. The present invention is able to produce electricity through the buoyant floating frame 1 and the plurality of electric generator pontoons 3 by utilizing marine current energy and marine wave energy so that the output of the present invention can be optimized. As show in FIG. 2 and FIG. 3, in order for the present invention to function, the buoyant floating frame 1 is positioned underneath water, where the buoyant floating frame 1 is connected to a seabed 10 by the floating frame mooring system 4. The plurality of electric generator pontoons 3 is connected with the buoyant floating frame 1 by a plurality of pontoon mooring systems 2, where the plurality of electric generator pontoons 3 functions as additional support floats while producing electricity.

Due to the high buoyancy to weight ratio of the buoyant floating frame 1, the buoyant floating frame 1 is able to float in near vertical position within the water of the marine environment. In reference to FIG. 4 and FIG. 5, the buoyant floating frame 1 comprises a plurality of structures 11, a front face 12, a rear face 13, a top surface 14, and a bottom surface 15. The plurality of structures 11, which comprises three-dimensional box-like units, is linearly positioned within the buoyant floating frame 1, and each of the plurality of structures 11 comprises a pair of connecting sleeves 111 and a marine current electric generator unit 112. More specifically, the plurality of structures 11 is arranged in a linear configuration of rows and columns so that none of the plurality of structures 11 is arranged in front or behind one another. The buoyant floating frame 1 of the present invention is preferably configured into four horizontal rows and six vertical columns, but the present invention is not limited only to the four horizontal rows and six vertical columns configuration and can be any other configuration of rows and columns. The front face 12 and the rear face 13 are oppositely positioned from each other on the plurality of structure of the buoyant floating frame 1. In reference to FIG. 6, the top surface 14 is perpendicularly positioned in between the front face 12 and the rear face 13, where the top surface 14 faces toward the surface of the water. The bottom surface 15 is perpendicularly positioned in between the front face 12 and the rear face 13 opposite from the top surface 14, where the bottom surface 15 faces toward the seabed 10. Due to the different configurations of the rows and columns, the buoyant floating frame 1 can have multiple embodiments within the present invention. Each of the plurality of structures 11 contains structural members, where each of the structural members forms into a triangular shape so that the overall structural stability of the buoyant floating frame 1 can be drastically improved. The distance between the front face 12 and rear face 13 of each of the plurality of structures 11, or the depth of each of the plurality of structures 11, is approximately half the height of each of the plurality of structures 11. Since the buoyant floating frame 1 is positioned underneath the water, the buoyant floating frame 1 absorbs less marine wave energy which results in minimum fatigue loading of the buoyant floating frame 1.

Figure 5:
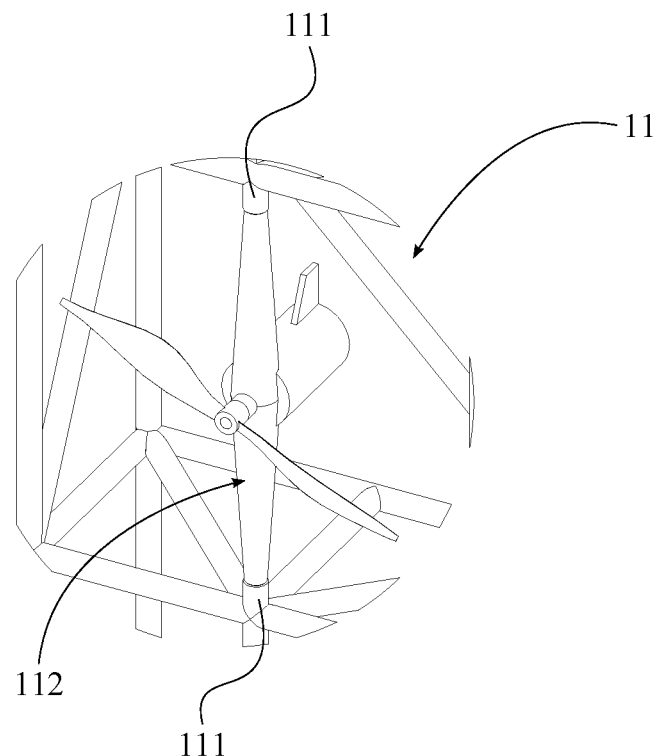
FIG. 5 is a detail sectional view of the buoyant floating frame taken within the detail circle D of FIG. 4.
Figure 11:
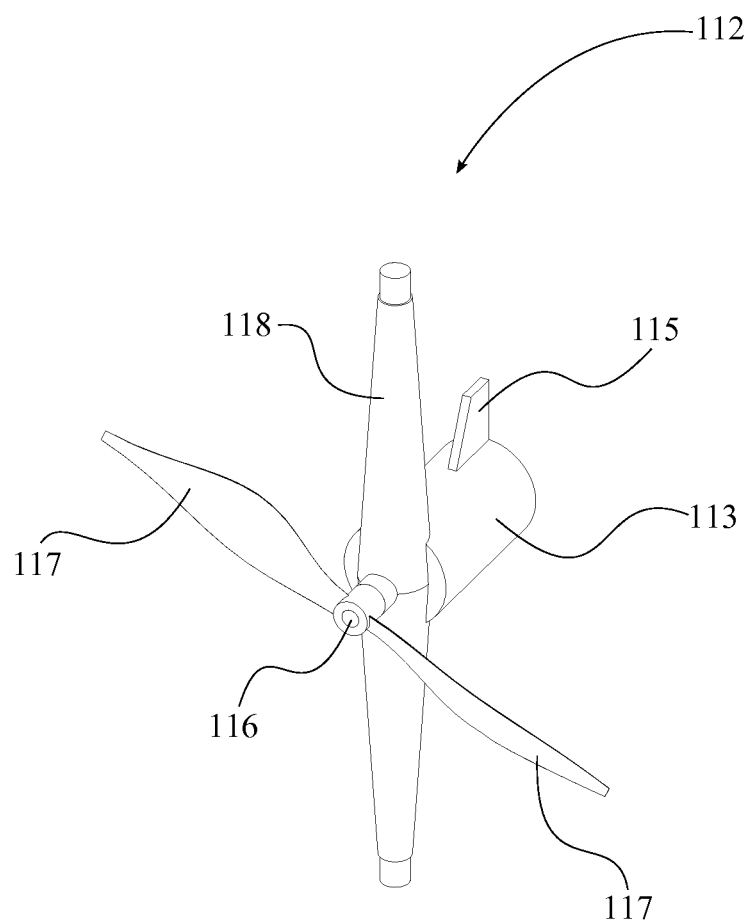
FIG. 11 is a perspective view of a marine current electric generator unit of the buoyant floating frame of the present invention.

In reference to FIG. 5, the pair of connecting sleeves 111 is permanently connected within each of the plurality of structures 11. The pair of connecting sleeves 111 is preferably positioned in the vertical direction within each of the plurality of structures 11, but can also be positioned in the horizontal direction. The marine current electric generator unit 112 is centrally connected with the pair of connecting sleeves 111 within each of the plurality of structures 11. In reference to FIG. 11, FIG. 12, and FIG. 13, the marine current electric generator unit 112 of the present invention is able to convert the marine current energy into the electricity, where the marine current electric generator unit 112 comprises a compartment casing 113, a stator generator 114, a directional fin 115, a rotor 116, blades 117, and a yaw mechanism 118. The stator generator 114 is positioned within the compartment casing 113, and the directional fin 115 is connected on the compartment casing 113, where the directional fin 115 is perpendicularly positioned with the top surface 14. The compartment casing 113 is perpendicularly connected with the yaw mechanism 118. The rotor 116 is rotatably connected with the stator generator 114, where the rotor 116 is traversed through the yaw mechanism 118 and into the compartment casing 113 opposite from the directional fin 115 without compromising the functionality of the marine current electric generator unit 112. The blades 117 are radially connected around the rotor 116 and adjacently positioned with the yaw mechanism 118. The yaw mechanism 118 is rotatably connected within the pair of connecting sleeves 111. Since the pair of connecting sleeves 111 is rotatably connected with the yaw mechanism 118 within each of the plurality of structures 11, the marine current electric generator unit 112 can rotate in any direction about its vertical axis so that the marine current electric generator unit 112 can adapt to the changing directions of the marine current energy. When the marine current energy flows past the directional fin 115, the applied force from the marine current energy rotates the marine current electric generator unit 112 in a similar manner to a wind turbine generator so that the rotor 116 remains perpendicular to the direction of the marine current. The rotating marine current electric generator unit 112 along with the pair of connecting sleeves 111 allows the marine current electric generator unit 112 to capture the maximum marine current energy resulting in maximum electrical output. Even though the yaw mechanism 118 of the present invention is rotatable within each of the plurality of structures 11, the yaw mechanism 118 can also be stationary within each of the plurality of structures 11.

Figure 4:
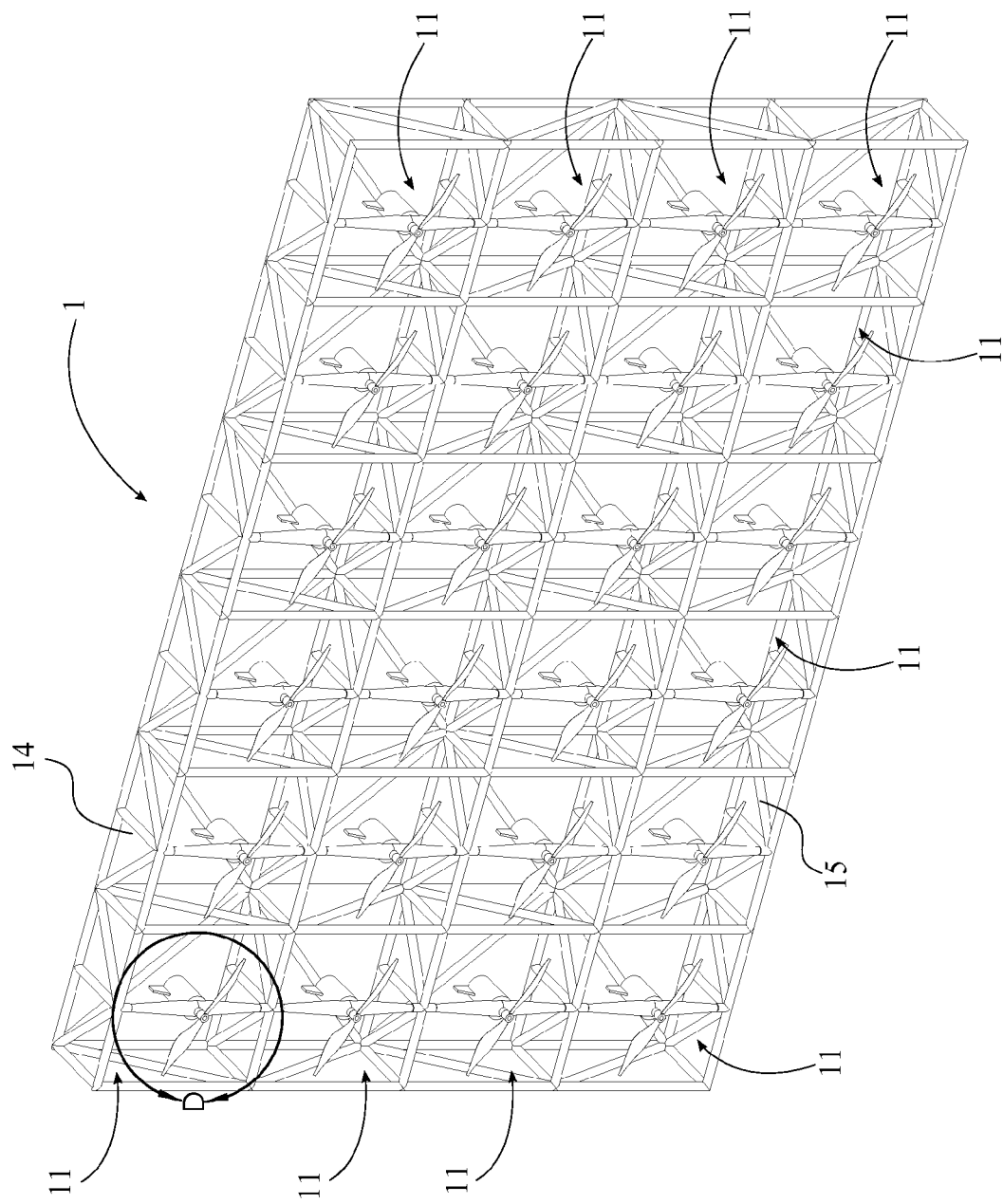
FIG. 4 is a perspective view of a first embodiment of a buoyant floating frame of the present invention, showing a plane upon which a detail sectional view is taken shown in FIG. 5.
Figure 6:
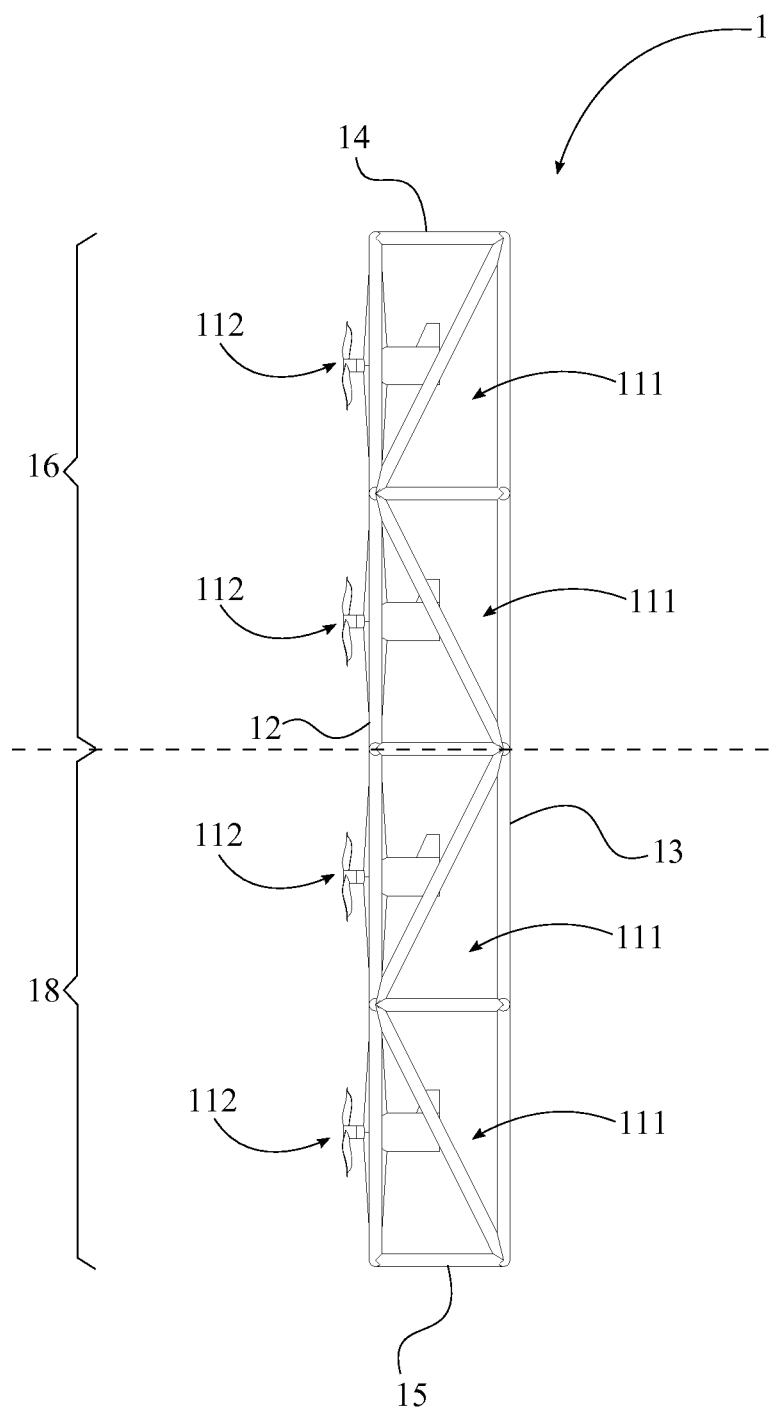
FIG. 6 is a side view of the first embodiment of the buoyant floating frame of the present invention.

In reference to FIG. 4 and FIG. 6, a first embodiment of the buoyant floating frame 1 comprises a rectangular shaped frame, and the rectangular shape frame comprises a top section 16 and a bottom section 18. The top section 16 is positioned atop the bottom section 18 completing the rectangular shaped frame, where length dimensions of the top section 16 and the bottom section 18 are equal to each other. The front face 12 and the rear face 13 of the top section 16 and the bottom section 18 for the first embodiment are linearly positioned with each other, creating a flat surface for both the front face 12 and the rear face 13. Since the first embodiment of the buoyant floating frame 1 is completely submerge in the water and connected with the seabed 10 by the floating frame mooring system 4, the flat surfaces of the first embodiment is able to stay in a near perpendicular position with respect to the direction of the marine current.

Figure 7:
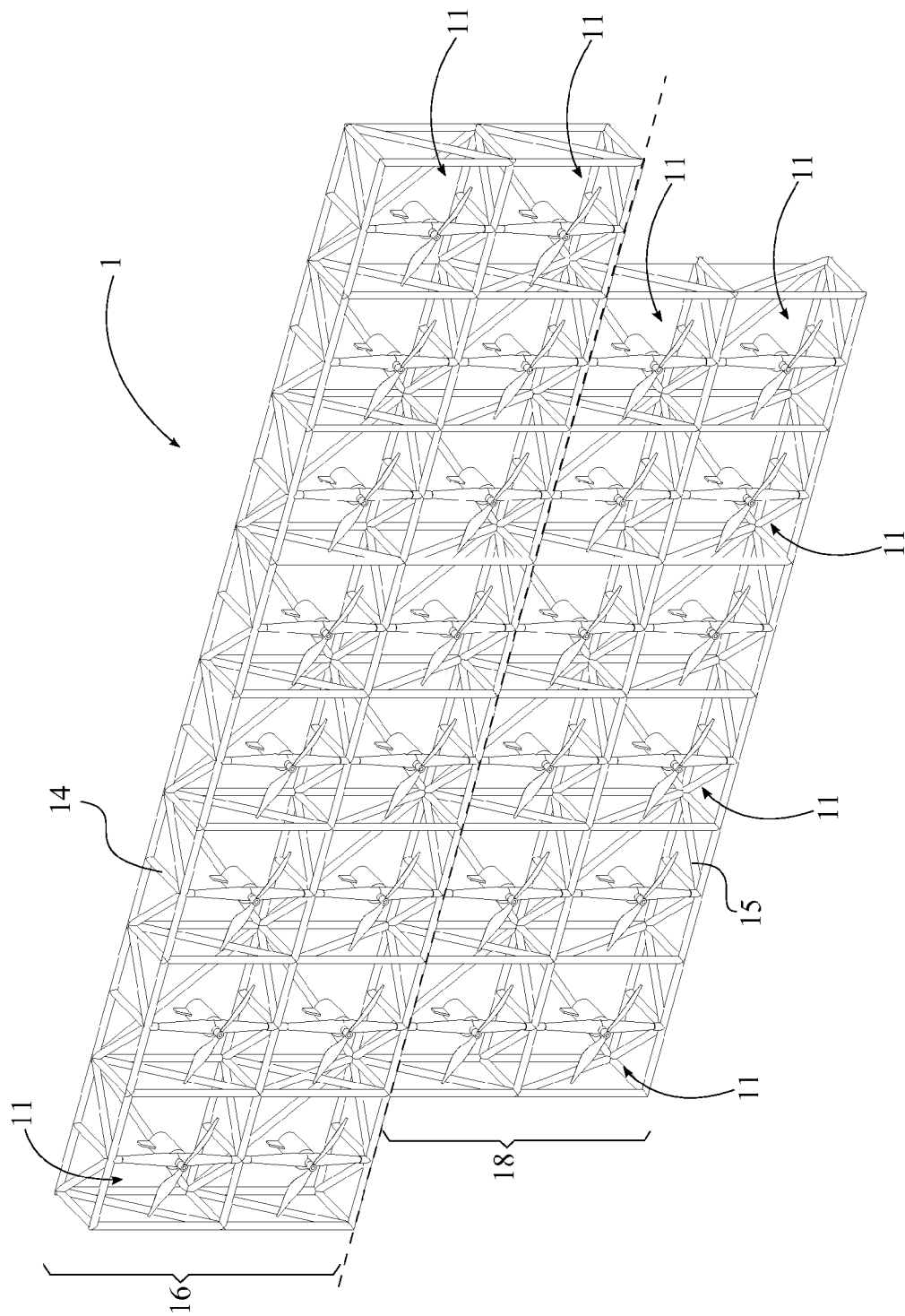
FIG. 7 is a perspective view of a second embodiment of the buoyant floating frame of the present invention.
Figure 8:
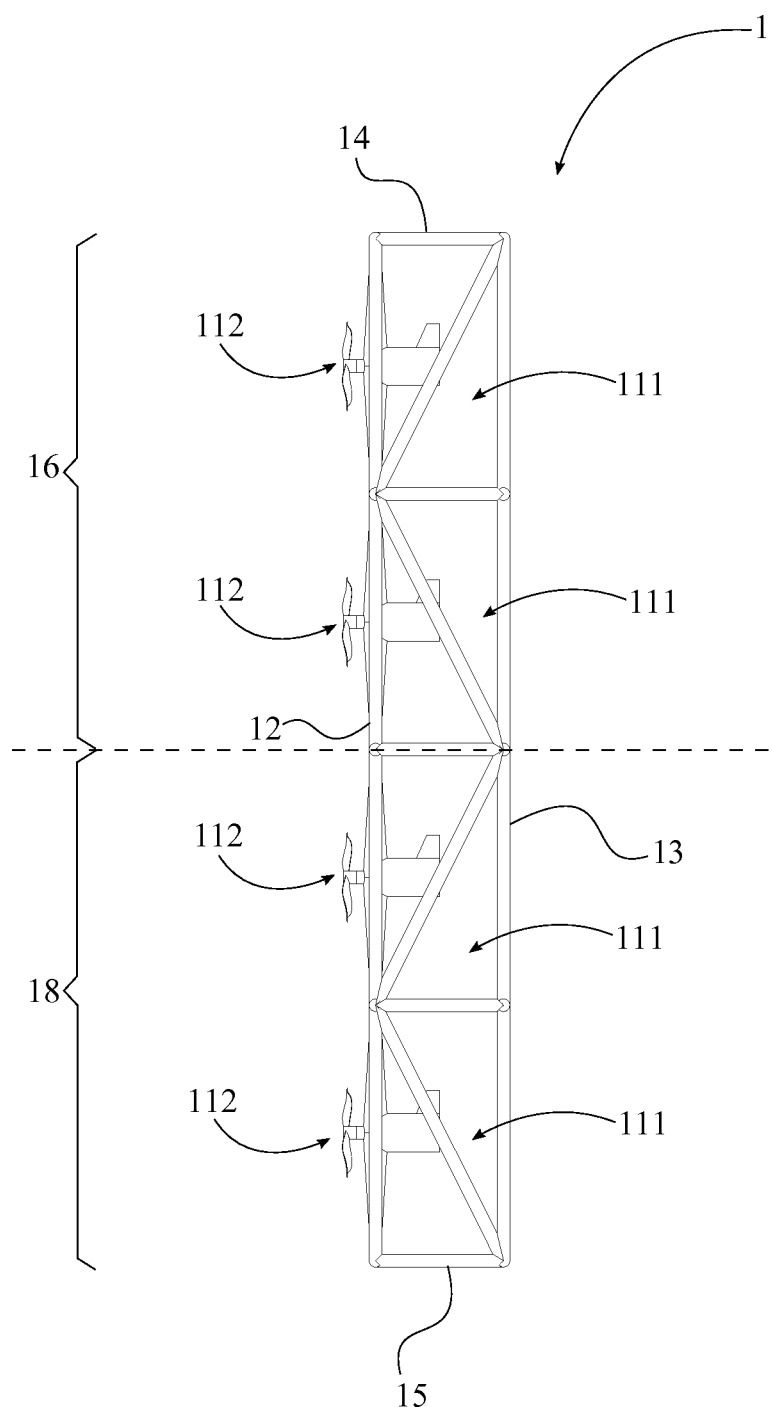
FIG. 8 is a side view of the second embodiment of the buoyant floating frame of the present invention.

In reference to FIG. 7 and FIG. 8, a second embodiment of the buoyant floating frame 1 comprises a tapered rectangular shaped frame, and the tapered rectangular shape frame comprises the top section 16 and the bottom section 18. The top section 16 is positioned atop the bottom section 18 completing the tapered rectangular shaped frame, where the length dimension of the top section 16 is larger than the length dimension of the bottom section 18. Because of the dimension difference between the top section 16 and the bottom section 18, a pair of tapered ends is created with the second embodiment of the buoyant floating frame 1. The front face 12 and the rear face 13 of the top section 16 and the bottom section 18 of the second embodiment are linearly positioned with each other, creating a flat surface for both the front face 12 and the rear face 13. Since the second embodiment of the buoyant floating frame 1 is also completely submerged in the water and connected with the seabed 10 by the floating frame mooring system 4, the flat surface of the second embodiment able to stay in a near perpendicular position with respect to the direction of the marine current. The pair of tapered ends allows the buoyant floating frame 1 to move in horizontal direction as the marine current energy flows through the plurality of structures 11, where the pair of tapered ends balances the floating frame mooring system 4 without interfering with functionality of the submerged buoyant floating frame 1.

Figure 9:
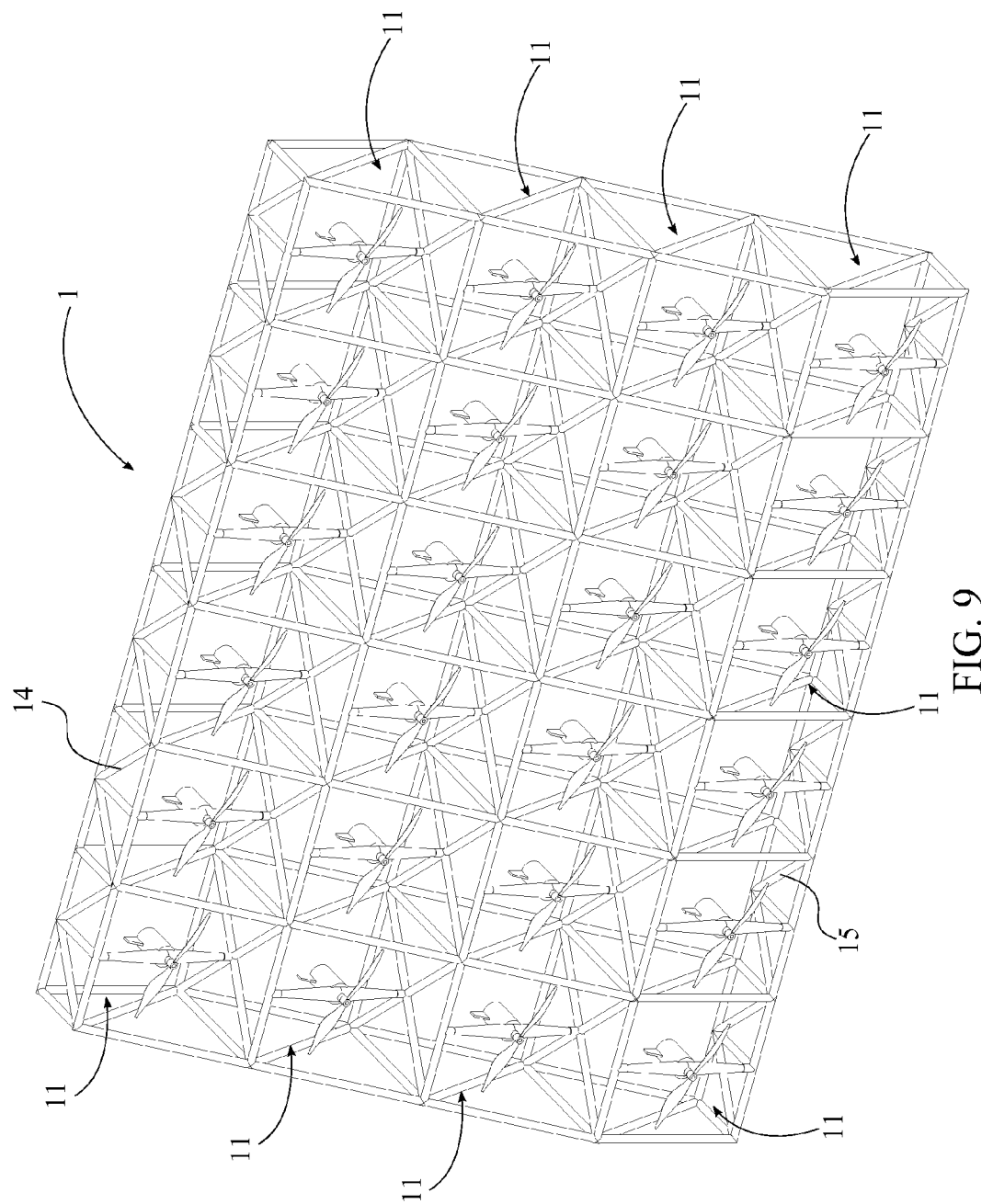
FIG. 9 is a perspective view of a third embodiment of the buoyant floating frame of the present invention.
Figure 10:
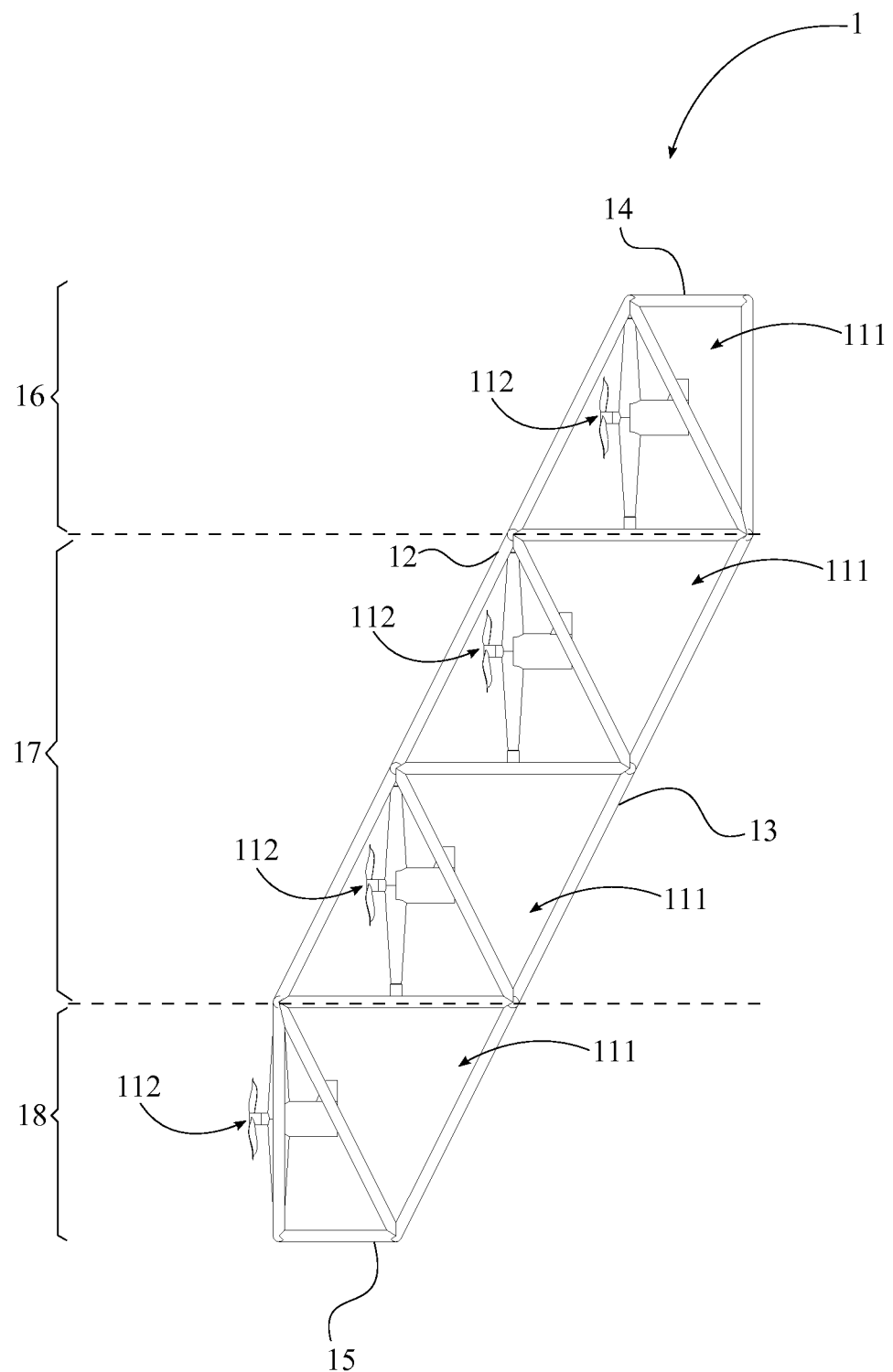
FIG. 10 is a side view of the third embodiment of the buoyant floating frame of the present invention.

In reference to FIG. 9 and FIG. 10, a third embodiment of the buoyant floating frame 1 comprises a slanted rectangular shaped frame, and the slanted rectangular shape frame comprises the top section 16, a middle section 17, and the bottom section 18. The middle section 17 is positioned in between the top section 16 and the bottom section 18 in a way that the top section 16 and the bottom section 18 are offset from each other, where the top section 16, the middle section 17, and the bottom section 18 complete the slanted rectangular shaped frame. The length dimensions of the top section 16, the middle section 17, and the bottom section 18 of the third embodiment of the buoyant floating frame 1 are equal to each other. The rear face 13 of the top section 16 in the slanted rectangular shaped frame is perpendicularly positioned with the top surface 14. The front face 12 of the bottom section 18 of the slanted rectangular shaped frame is perpendicularly positioned with the bottom surface 15, where the front face 12 of the bottom section 18 and the rear face 13 of the top section 16 are positioned parallel to each other. The front face 12 of the top section 16 and the middle section 17 are linearly positioned with each other in between the top surface 14 and the front face 12 of the bottom section 18. The rear face 13 of the bottom section 18 and the middle section 17 are linearly positioned with each other in between the bottom surface 15 and the rear face 13 of the top section 16, where the rear face 13 of the bottom section 18 and the middle section 17 are positioned parallel with the front face 12 of the top section 16 and the middle section 17. Since the third embodiment of the buoyant floating frame 1 is also completely submerged in the water and connected with the seabed 10 by the floating frame mooring system 4, the front face 12 of the bottom section 18 and the rear face 13 of the top section 16 are able to stay in a near perpendicular position with respect to the direction of the marine current while the front face 12 of the top section 16 and the middle section 17 and the rear face 13 of the middle section 17 and the bottom section 18 are arranged in a slanted position with respect to the direction of the marine current.

The slanted rectangular shape frame has several advantages over the tapered rectangular shaped frame and the rectangular shaped frame. The slanted rectangular shape frame increases the distance between the attachment points of the floating frame mooring system 4, increasing the stability of the slanted rectangular shape frame and lowering the load for the floating frame mooring system 4. The slanted rectangular shape frame also maintains a near maximum possible exposure of the marine current electric generator units 112 to the marine currents. The slanted rectangular shape frame also eliminates the need to reduce the length dimension of the bottom section 18 of the slanted rectangular shape frame in order to avoid the interference from the floating frame mooring system 4 as the top section 16 and the bottom section 18 of the slanted rectangular shape frame are offset.

The floating frame mooring system 4, which connects the buoyant floating frame 1 of the present invention with the seabed 10, comprises a low depth attachment system 41 and a high depth attachment system 42. Incorporating either the low depth attachment system 41 or the high depth attachment system 42, the position of the buoyant floating frame 1 can range from 10 to over 1000 meters below the surface of the water. The low depth attachment system 41 and the high depth attachment system 42 are located at favorable points on the buoyant floating frame 1 to both minimize applied load and to minimize inclination angles deviation under maximum design environmental loading of the buoyant floating frame 1 from its unloaded orientation. The locations of the buoyant floating frame 1 installation are not limited by the seabed 10 conditions because the floating frame mooring system 4 may adapt to whatever conditions are found.

Figure 2:
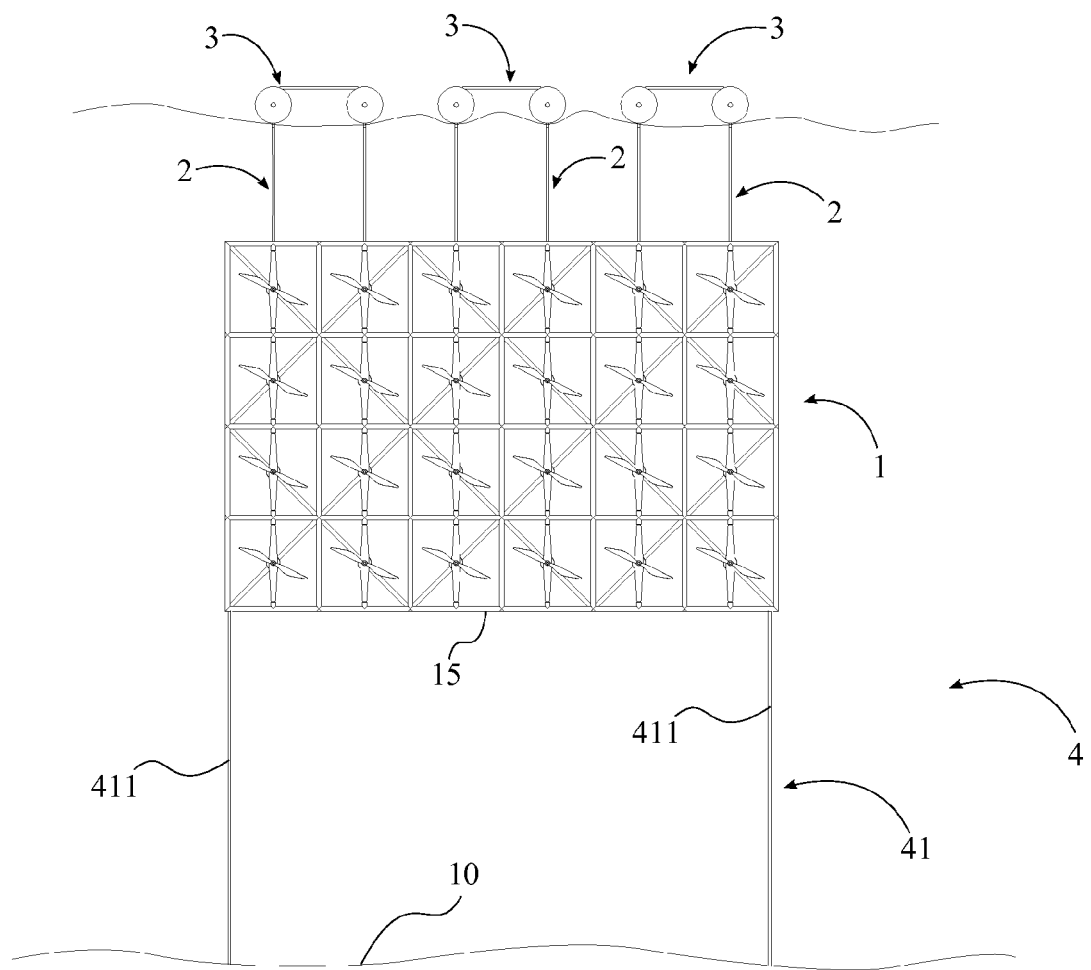
FIG. 2 is a front view of the present invention, wherein the present invention is connected with a seabed by a low depth attachment system.

In reference to FIG. 2, the low depth attachment system 41 comprises seabed tension mooring legs 411. The seabed tension mooring legs 411, that can include, but is not limited to taunt moorings, catenary moorings, fixed legs, and tension leg moorings, are connected with the seabed 10 and the bottom surface 15 of the buoyant floating frame 1 in order to keep the buoyant floating frame 1 submerged. More specifically, the first embodiment, the second embodiment, and the third embodiment of the buoyant floating frame 1 comprise three different configurations of the low depth attachment system 41. For the first embodiment of the buoyant floating frame 1, the bottom surface 15 of the rectangular shaped frame is connected with the seabed 10 by the extending seabed tension mooring legs 411, where the bottom surface 15 is positioned on the bottom section 18 opposite from the top surface 14. The seabed tension mooring legs 411 are able to provide an equilibrium environment for the rectangular shaped frame as they are equally spaced within the bottom surface 15. For the second embodiment of the buoyant floating frame 1, the bottom surface 15 of the tapered rectangular shaped frame is connected with the seabed 10 by the extending seabed tension mooring legs 411, where the bottom surface 15 is positioned on the bottom section 18 and the top section 16 opposite from the top surface 14. The seabed tension mooring legs 411 are able to provide an equilibrium environment for the tapered rectangular shaped frame as they are equally spaced within the bottom surface 15 and the pair of tapered ends. For the third embodiment of the buoyant floating frame 1, the bottom surface 15 of the slanted rectangular shaped frame is connected with the seabed 10 by the extending seabed tension mooring legs 411, where the bottom surface 15 is positioned on the bottom section 18 opposite from the top surface 14. In the third embodiment of the buoyant floating frame 1, the low depth attachment system 41 further comprises top section mooring legs which extend toward the seabed 10 from the rear face 13 of the top section 16. The top section mooring legs provide equilibrium for the slanted rectangular shaped frame as the top section mooring legs connect with the seabed 10 distributing the weight of the slanted rectangular shaped frame.

Figure 3:
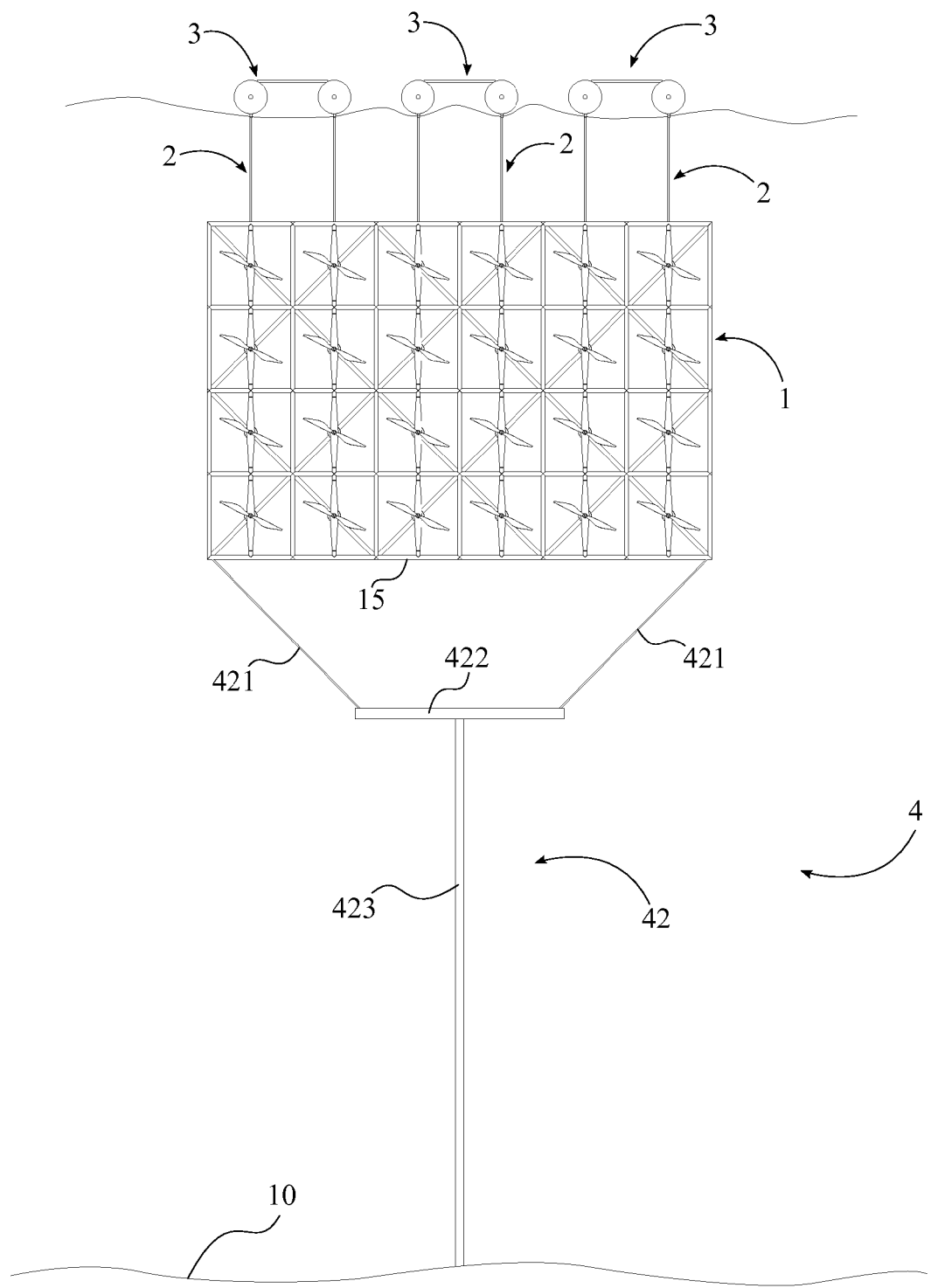
FIG. 3 is a front view of the present invention, wherein the present invention is connected with the seabed by a high depth attachment system.

In reference to FIG. 3, the high depth attachment system 42 comprises a plurality of frame connecting legs 421, a sea anchor 422, and at least one sea anchor mooring leg 423. The at least one sea anchor mooring leg 423 connects the sea anchor 422 to the seabed 10, where the sea anchor 422 provides an additional foundation for the buoyant floating frame 1 and stabilizes the vertical movement of the buoyant floating frame 1. More specifically, the sea anchor 422 is a high drag coefficient balanced counter weight which eliminates the seabed tension mooring legs 411 by existing in between the seabed 10 and the buoyant floating frame 1 in order to decrease the amount of material being used within high depth attachment situations. The at least one sea anchor mooring leg 423 can include, but is not limited to a taunt mooring, a catenary mooring, a fixed leg, a tension leg mooring, and a vertical pile or column. The plurality of frame connecting legs 421 is connected with the sea anchor 422 and the bottom surface 15 of the buoyant floating frame 1 in order to keep the buoyant floating frame 1 submerged within the water. The plurality of frame connecting legs 421 can include, but is not limited to taunt moorings, catenary moorings, and fixed legs. More specifically, the first embodiment, the second embodiment, and the third embodiment of the buoyant floating frame 1 comprise three different configurations of the high depth attachment system 42. For the first embodiment of the buoyant floating frame 1, the bottom surface 15 of the rectangular shaped frame is connected with the sea anchor 422 by the extending plurality of frame connecting legs 421, where the bottom surface 15 is positioned on the bottom section 18 opposite from the top surface 14. The plurality of frame connecting legs 421 is able to provide an equilibrium environment for the rectangular shaped frame as they are equally spaced within the bottom surface 15. The sea anchor 422 connects with the seabed 10 through the at least one sea anchor mooring leg 423 completing the high depth attachment system 42. For the second embodiment of the buoyant floating frame 1, the bottom surface 15 of the tapered rectangular shaped frame is connected with the sea anchor 422 by the extending plurality of frame connecting legs 421, where the bottom surface 15 is positioned on the bottom section 18 and the top section 16 opposite from the top surface 14. The plurality of frame connecting legs 421 is able to provide an equilibrium environment for the tapered rectangular shaped frame as they are equally spaced within the bottom surface 15 and the pair of tapered ends. The sea anchor 422 connects with the seabed 10 through the at least one sea anchor mooring leg 423 completing the high depth attachment system 42. For the third embodiment of the buoyant floating frame 1, the bottom surface 15 of the slanted rectangular shaped frame is connected with the sea anchor 422 by the extending plurality of frame connecting legs 421, where the bottom surface 15 is positioned on the bottom section 18 opposite from the top surface 14. Similar to the low depth attachment system 41 of the third embodiment of the buoyant floating frame 1, the high depth attachment system 42 further comprises the top section mooring legs which extends toward the sea anchor 422 from the rear face 13 of the top section 16. The top section mooring legs provide equilibrium for the slanted rectangular shaped frame as the top section mooring legs connect with the sea anchor 422. The sea anchor 422 connects with the seabed 10 through the at least one sea anchor mooring leg 423 completing high depth attachment system 42.

In reference to FIG. 1 and FIG. 14-FIG. 22, the plurality of electric generator pontoons 3 of the present invention is able to produce electricity along with the buoyant floating frame 1, where the plurality of electric generator pontoons 3 of the present invention is either single pontoon units 31 or double pontoon units 32, or the plurality of electric generator pontoons 3 is a combination of both the single pontoon units 31 and the double pontoon units 32. The plurality of electric generator pontoons 3 connects with the buoyant floating frame 1 through the plurality of pontoon mooring systems 2 so that the plurality of electric generator pontoons 3 is able to provide additional buoyancy to the buoyant floating frame 1. Since the plurality of electric generator pontoons 3 provides additional buoyancy to the buoyant floating frame 1, the buoyant floating frame 1 does not have to be increased in size to achieve additional buoyancy. The plurality of electric generator pontoons 3 may be completely submerged if maximum buoyancy is desired or may float on the surface of the water. Submerging the plurality of electric generator pontoons 3 is ideal in many instances because they provide the most buoyancy and don't contribute to visual pollution of the water and enable vessel to operate above the submerged plurality of electric generator pontoons 3. The floating plurality of electric generator pontoons 3 provides the most power production but contributes into the visual pollution of the water and restricts vessel operation. The functionality of the plurality of electric generator pontoons 3 remains constant within the present invention, whether the plurality of electric generator pontoons 3 is completely submerged or not. The plurality of electric generator pontoons 3 can also connect with the seabed 10 without the buoyant floating frame 1 as separate electric generating units, where different connection methods are used depending on the characteristic of the water and the seabed 10.

Figure 14:
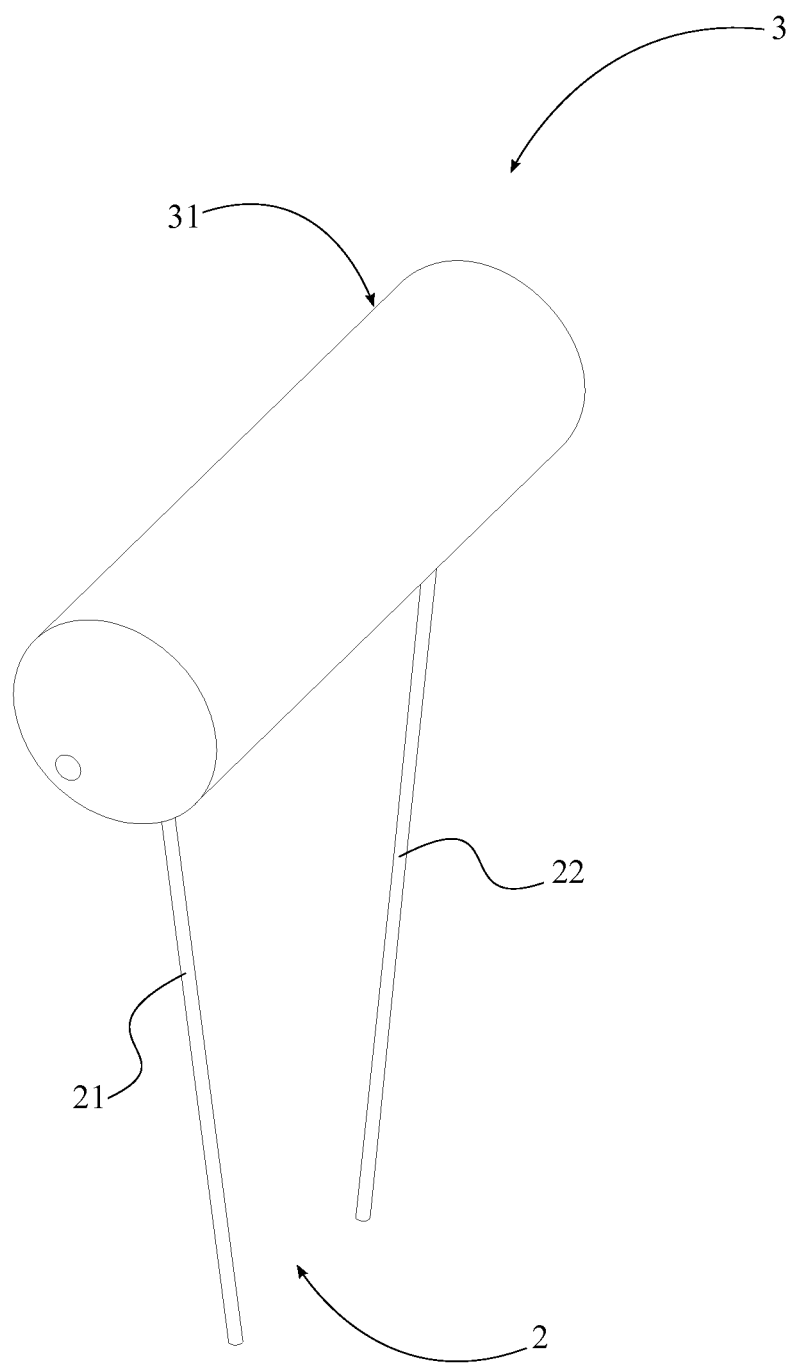
FIG. 14 is a perspective view of a single pontoon unit of a plurality of electric generator pontoons of the present invention.
Figure 16:
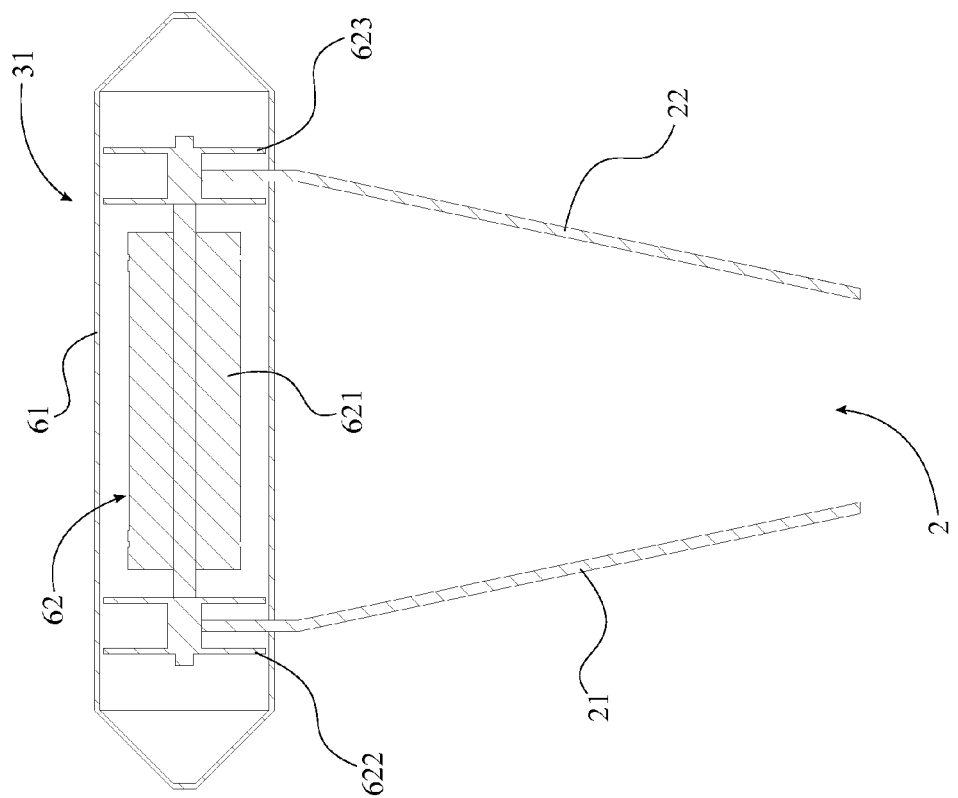
FIG. 16 is a cross sectional view of the single pontoon unit of the present invention taken along the line A-A of FIG. 15.
Figure 15:
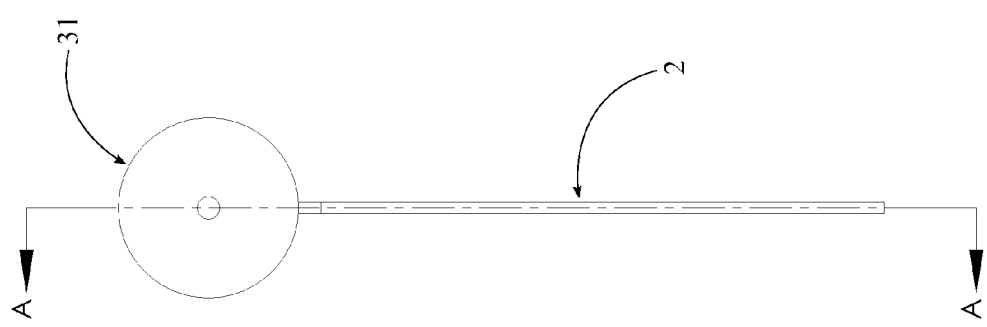
FIG. 15 is a front view of the single pontoon unit of the present invention, showing a plane upon which a cross sectional view is taken shown in FIG. 16.

As shown in FIG. 14-FIG. 16, each of the single pontoon units 31 comprises a floating body 61 and a wave electric generator 62, where the wave electric generator 62 is centrally positioned within the floating body 61. The floating body 61 is preferably made into a circular shape, but the floating body 61 is not limited only to the circular shape and can be any other geometric shapes. Each extremity of the floating body 61 is shaped into a tapered shape to reduce the drag when the water flows by the floating body 61. The wave electric generator 62 comprises a stator electric generator 621, a first rotor 622, and a second rotor 623. The first rotor 622 and the second rotor 623 are rotatably connected with the stator electric generator 621, where the stator electric generator 621 is positioned in between the first rotor 622 and the second rotor 623. The plurality of pontoon mooring systems 2 of the single pontoon units 31 comprises a first connecting element 21 and a second connecting element 22. The first connecting element 21 is connected with the first rotor 622 and the top surface 14 of the buoyant floating frame 1, and the second connecting element 22 is connected with the second rotor 623 and the top surface 14 of the buoyant floating frame 1. Since the wave electric generator 62 is positioned within the floating body 61, the first connecting element 21 and the second connecting element 22 are traversed through the floating body 61. As the marine waves flow by the single pontoon units 31, the wave electric generator 62 vertically moves up and down along with the floating body 61 creating electricity through the stator electric generator 621, the first rotor 622, the second rotor 623, and other related components. More specifically, when marine waves hit the single pontoon units 31, the floating body 61 of each of the single pontoon units 31 rise with the marine waves turning the first rotor 622 and the second rotor 623 which simultaneously turn the stator electric generator 621. When the marine waves get lower, the floating body 61 of each of the single pontoon units 31 falls back with the marine waves, where the plurality of pontoon mooring systems 2 returns to their initial position by re-coil springs of the other related components while keeping the stator electric generator 621 continuously turning by flywheels of the other related components.

Figure 17:
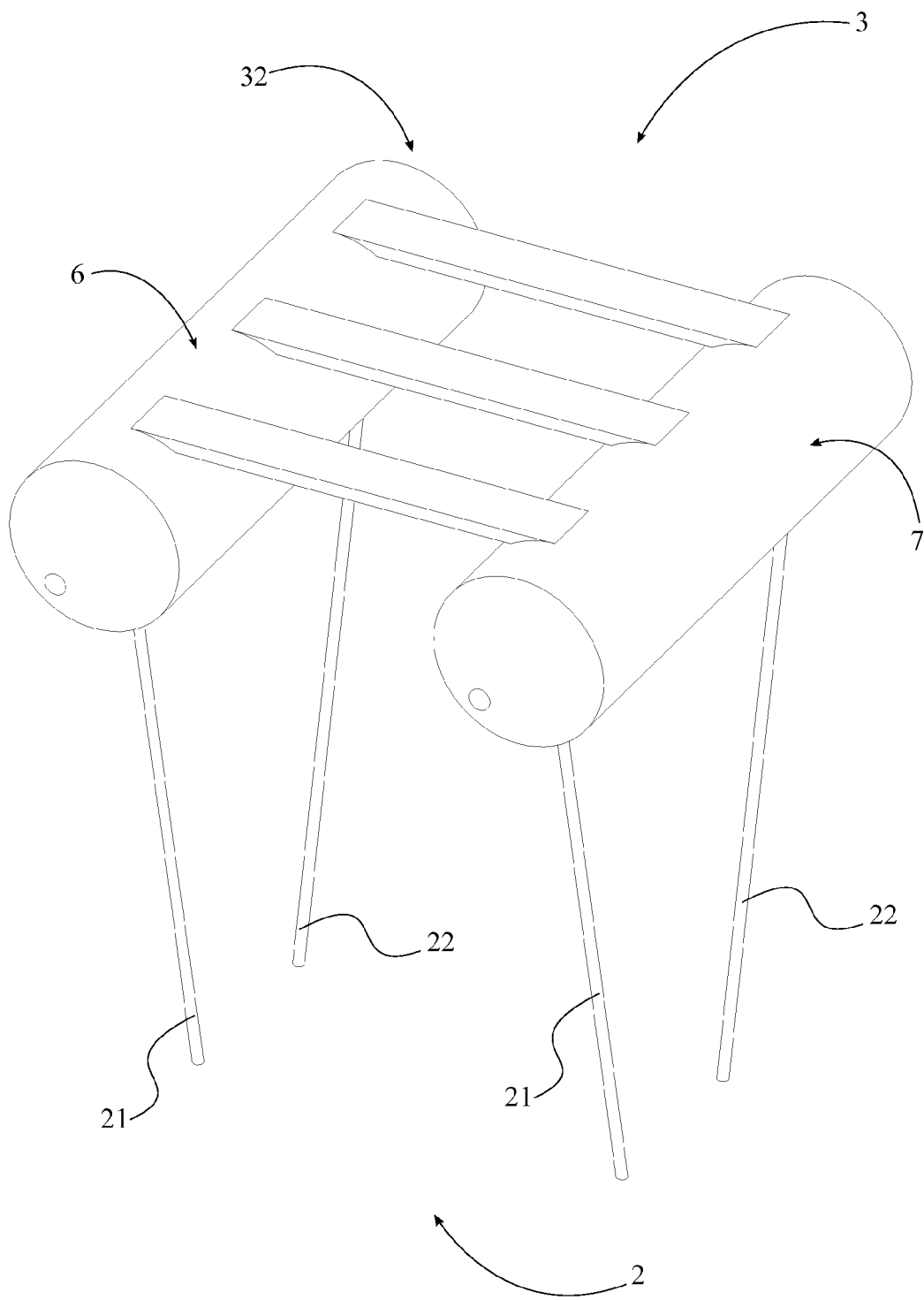
FIG. 17 is a perspective view of a double pontoon unit of the plurality of electric generator pontoons of the present invention.
Figure 19:
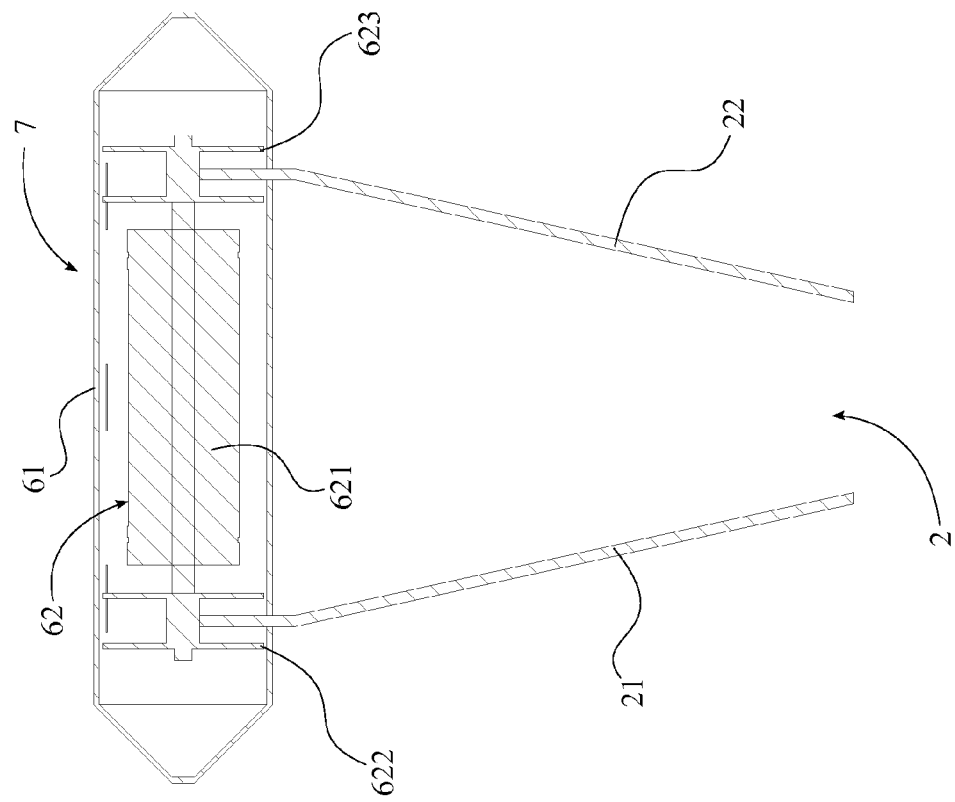
FIG. 19 is a cross sectional view of the double pontoon unit of the present invention taken along the line A-A of FIG. 18.
Figure 18:
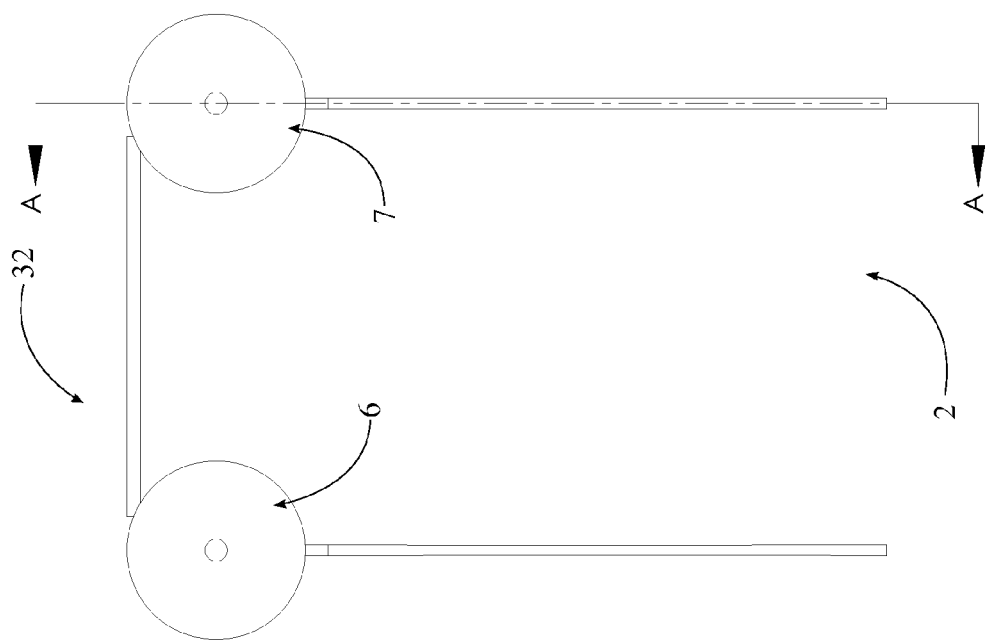
FIG. 18 is a front view of the double pontoon unit of the present invention, showing a plane upon which a cross sectional view is taken shown in FIG. 19.

As shown in FIG. 17-FIG. 19, each of the double pontoon units 32 comprises a first pontoon 6 and a second pontoon 7. The first pontoon 6 and the second pontoon 7 are connected parallel to each other in a way that the first pontoon 6 is linearly and oppositely positioned from the second pontoon 7. The first pontoon 6 and the second pontoon 7 each comprises the floating body 61 and the wave electric generator 62 where the wave electric generator 62 is centrally positioned within the floating body 61. The floating body 61 is preferably made into a circular shape, but the floating body 61 is not limited only to the circular shape and can be any other geometric shapes. Each extremity of the floating body 61 is shaped into a conical shape to reduce the drag when the water flows by the floating body 61. The wave electric generator 62 comprises the stator electric generator 621, the first rotor 622, and the second rotor 623. The first rotor 622 and the second rotor 623 are rotatably connected with the stator electric generator 621, where the stator electric generator 621 is positioned in between the first rotor 622 and the second rotor 623. The plurality of pontoon mooring systems 2 of the double pontoon units 32 comprises the first connecting element 21 and the second connecting element 22 for the first pontoon 6 and the second pontoon 7. The first connecting element 21 of the first pontoon 6 is connected with the first rotor 622 of the first pontoon 6 and the top surface 14 of the buoyant floating frame 1, and the second connecting element 22 of the first pontoon 6 is connected with the second rotor 623 of the first pontoon 6 and the top surface 14 of the buoyant floating frame 1. The first connecting element 21 of the second pontoon 7 is connected with the first rotor 622 of the second pontoon 7 and the top surface 14 of the buoyant floating frame 1, and the second connecting element 22 of the second pontoon 7 is connected with the second rotor 623 of the second pontoon 7 and the top surface 14 of the buoyant floating frame 1. Since the wave electric generator 62 is positioned within the floating body 61 of the first pontoon 6 and the second pontoon 7, the first connecting element 21 and the second connecting element 22 of the first pontoon 6 and the second pontoon 7 are respectively traversed through the floating body 61 of the first pontoon 6 and the second pontoon 7. As the marine waves flow by the double pontoon units 32, the wave electric generators 62 vertically move up and down along with the floating bodies 61 creating electricity through the stator electric generator 621, the first rotor 622, the second rotor 623, and the other related components of the first pontoon 6 and the second pontoon 7. More specifically, when marine waves hit the double pontoon units 32, the floating bodies 61 of the first pontoon 6 and the second pontoon 7 rise with the marine waves turning the first rotor 622 and the second rotor 623 of the first pontoon 6 and the second pontoon 7 which simultaneously turn the stator electric generator 621 of the first pontoon 6 and the second pontoon 7. When the marine waves get lower, the double pontoon units 32 fall back with the marine waves, where the plurality of pontoon mooring systems 2 returns to their initial position by the re-coil springs of the first pontoon 6 and the second pontoon 7 while the flywheels continuously turn the stator electric generator 621 of the first pontoon 6 and the second pontoon 7.

In an alternative embodiment, the first pontoon 6 and the second pontoon 7 of the each of the double pontoon units 32 can be enclosed with a water tight enclosure, where the water tight enclosure allows the plurality of pontoon mooring systems 2 to traverse through the water tight enclosure. Since the surface area of the water tight enclosures significantly higher compare to the surface area of the double pontoon units 32, maximum marine wave force can be captured within the water tight enclosure which results into maximum power output from the doubled pontoon units.

Figure 20:
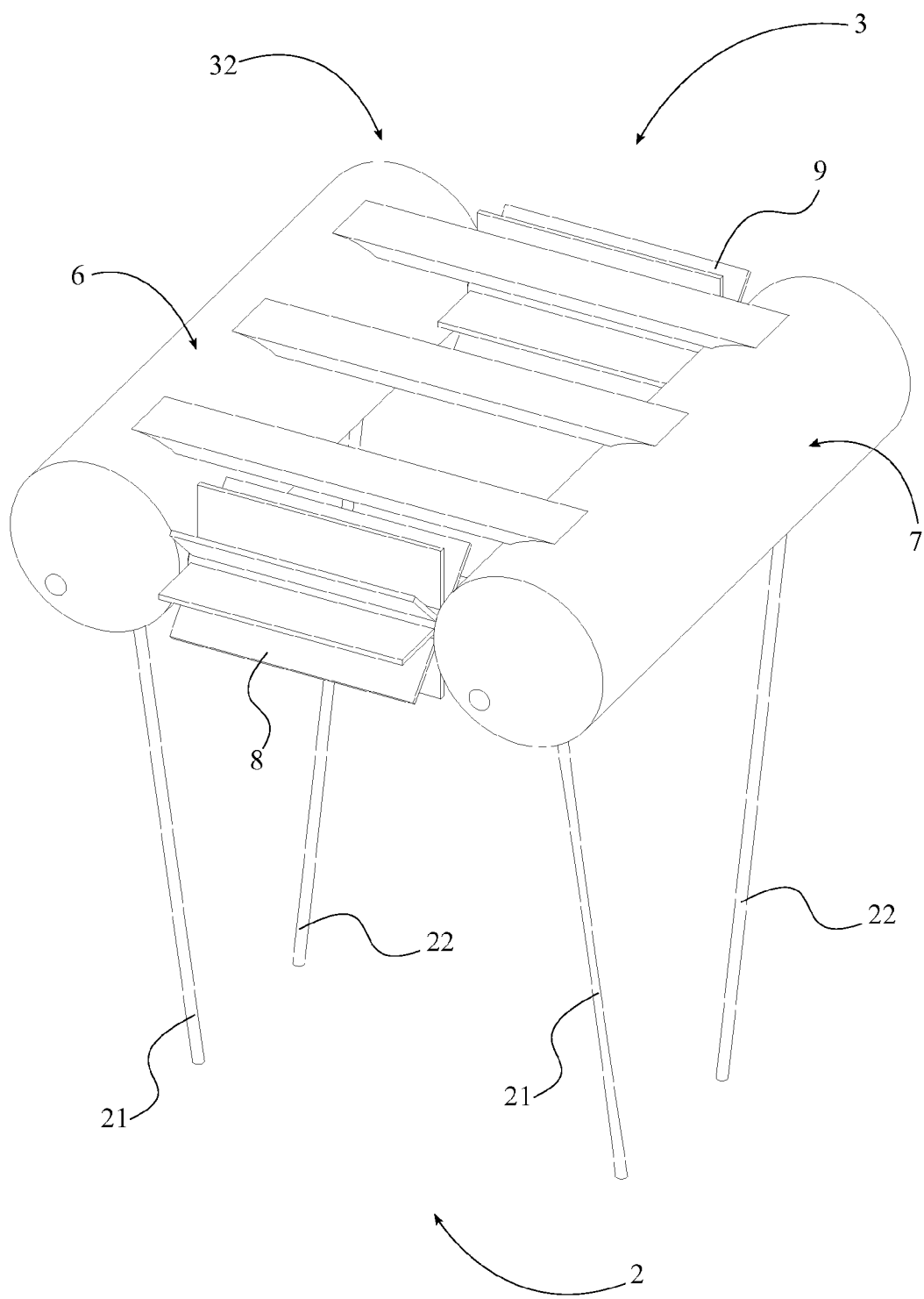
FIG. 20 is a perspective view of alternative embodiment of the double pontoon unit of the plurality of electric generator pontoons of the present invention.
Figure 22:
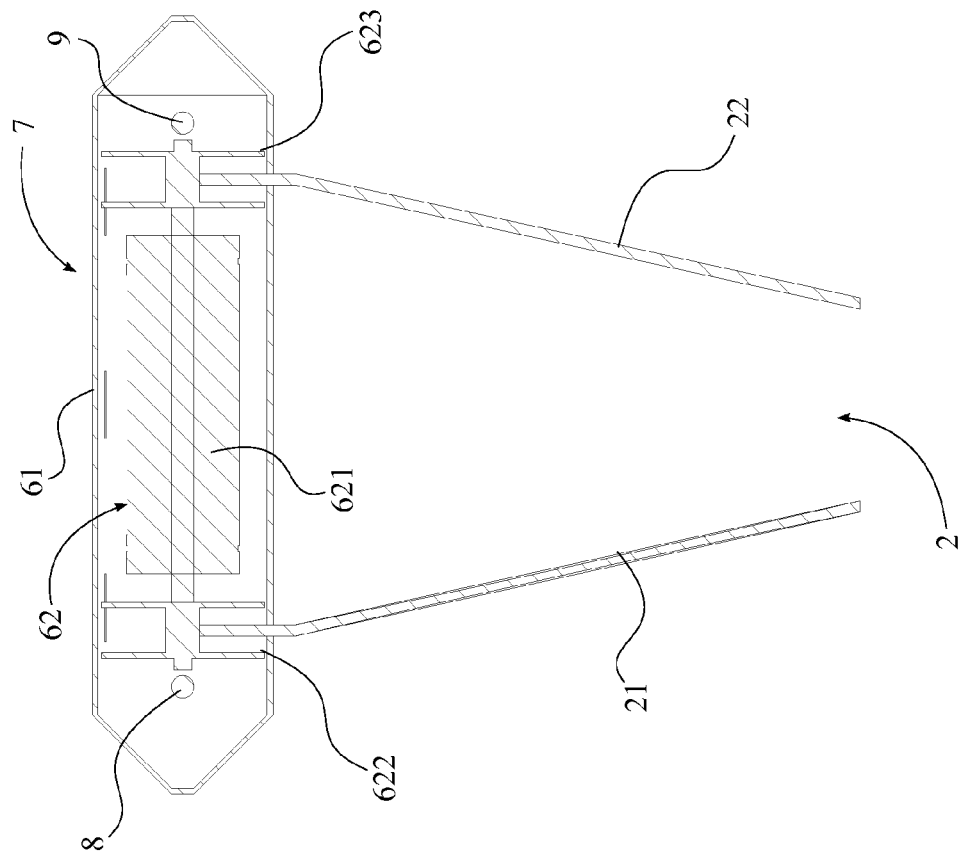
FIG. 22 is a cross sectional view of the alternative embodiment of the double pontoon unit of the present invention taken along the line A-A of FIG. 21.
Figure 21:
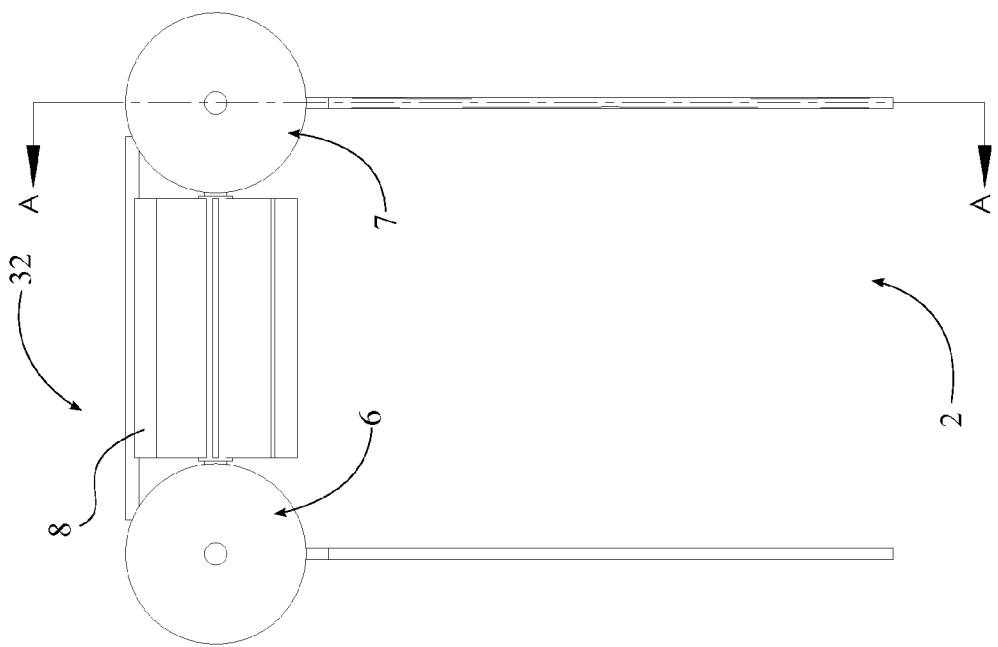
FIG. 21 is a front view of the alternative embodiment of the double pontoon unit of the present invention, showing a plane upon which a cross sectional view is taken shown in FIG. 22.

As shown in FIG. 20-FIG. 22, in another alternative embodiment, each of the double pontoon units 32 comprises a first marine current electric generator 8 and a second marine current electric generator 9. The first marine current electric generator 8 and the second marine current electric generator 9 are perpendicularly connected with the first pontoon 6 and the second pontoon 7, where the first marine current electric generator 8 and the second marine current electric generator 9 are oppositely positioned from each other along the first pontoon 6 and the second pontoon 7. The first marine current electric generator 8 and the second marine current electric generator 9 harvest the marine current and convert the marine current into electricity as the marine current flows by the double pontoon units 32, where the first marine current electric generator 8 and the second marine current electric generator 9 can be paddle wheel generators, turbine generators, or any other type of generators that can converts the marine current into electricity.

Figure 23:
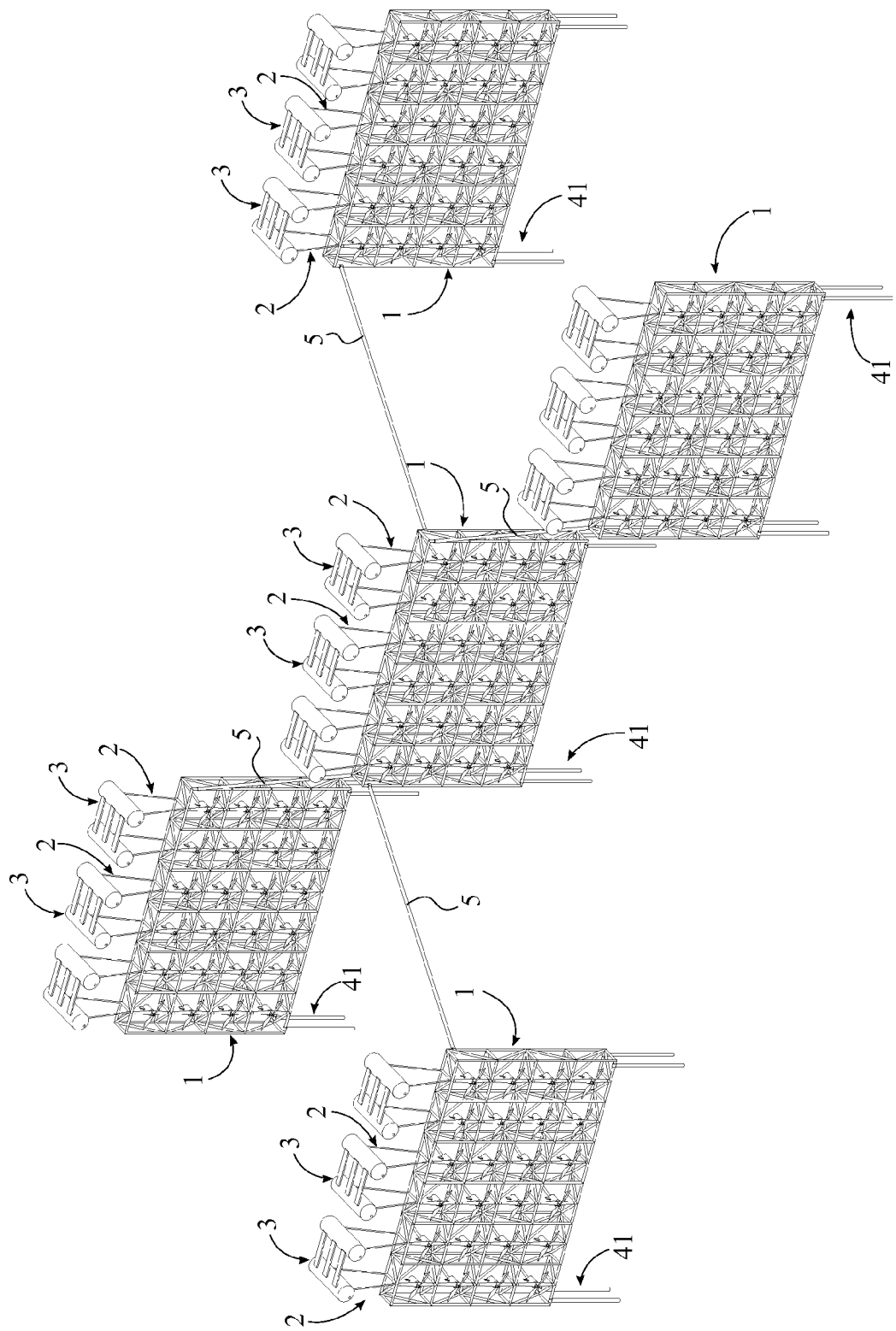
FIG. 23 is a perspective view of a power farm of the present invention, showing a horizontal mooring system and the low depth attachment system.
Figure 24:
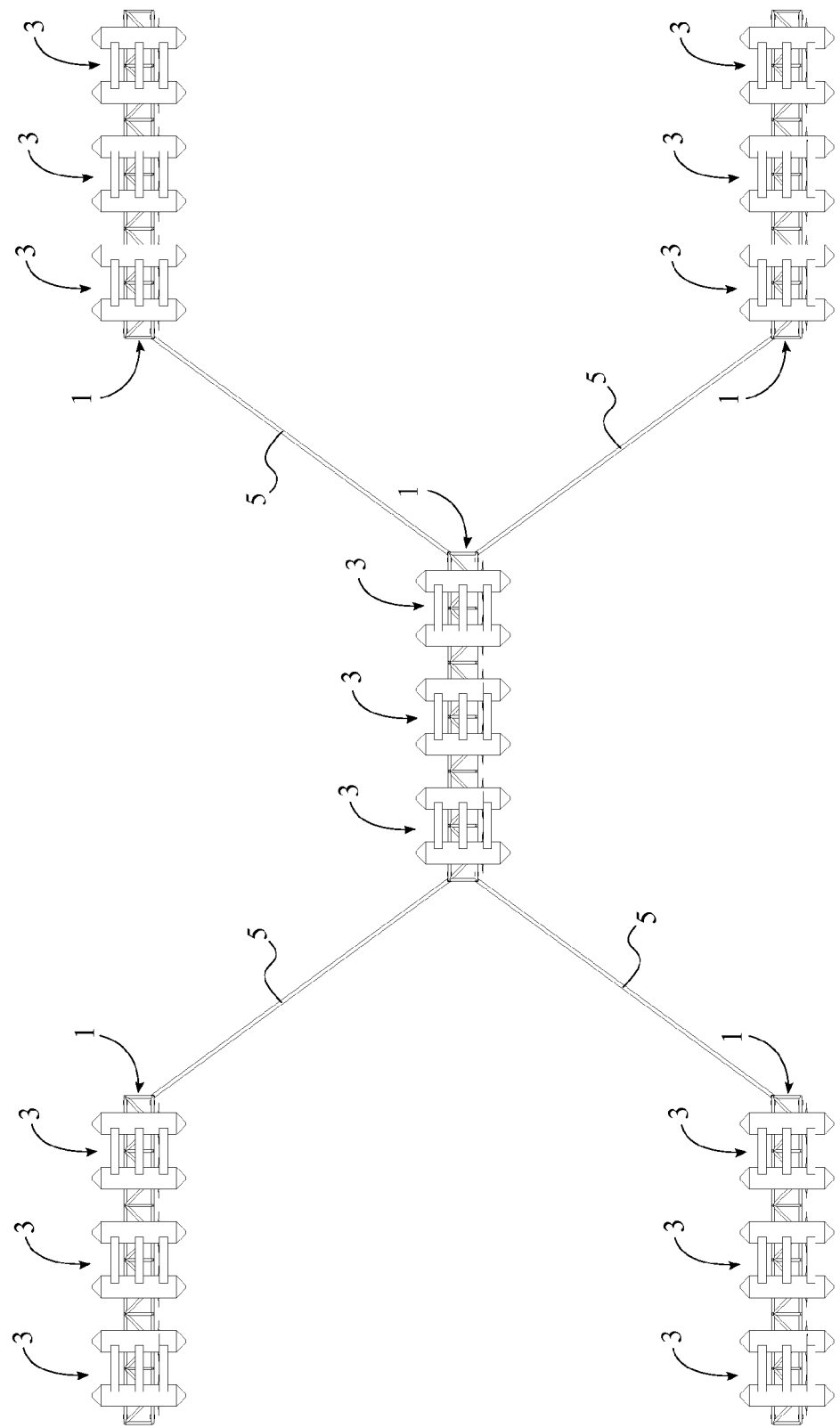
FIG. 24 is a top view of the power farm of the present invention, showing the horizontal mooring system and the low depth attachment system.
Figure 25:
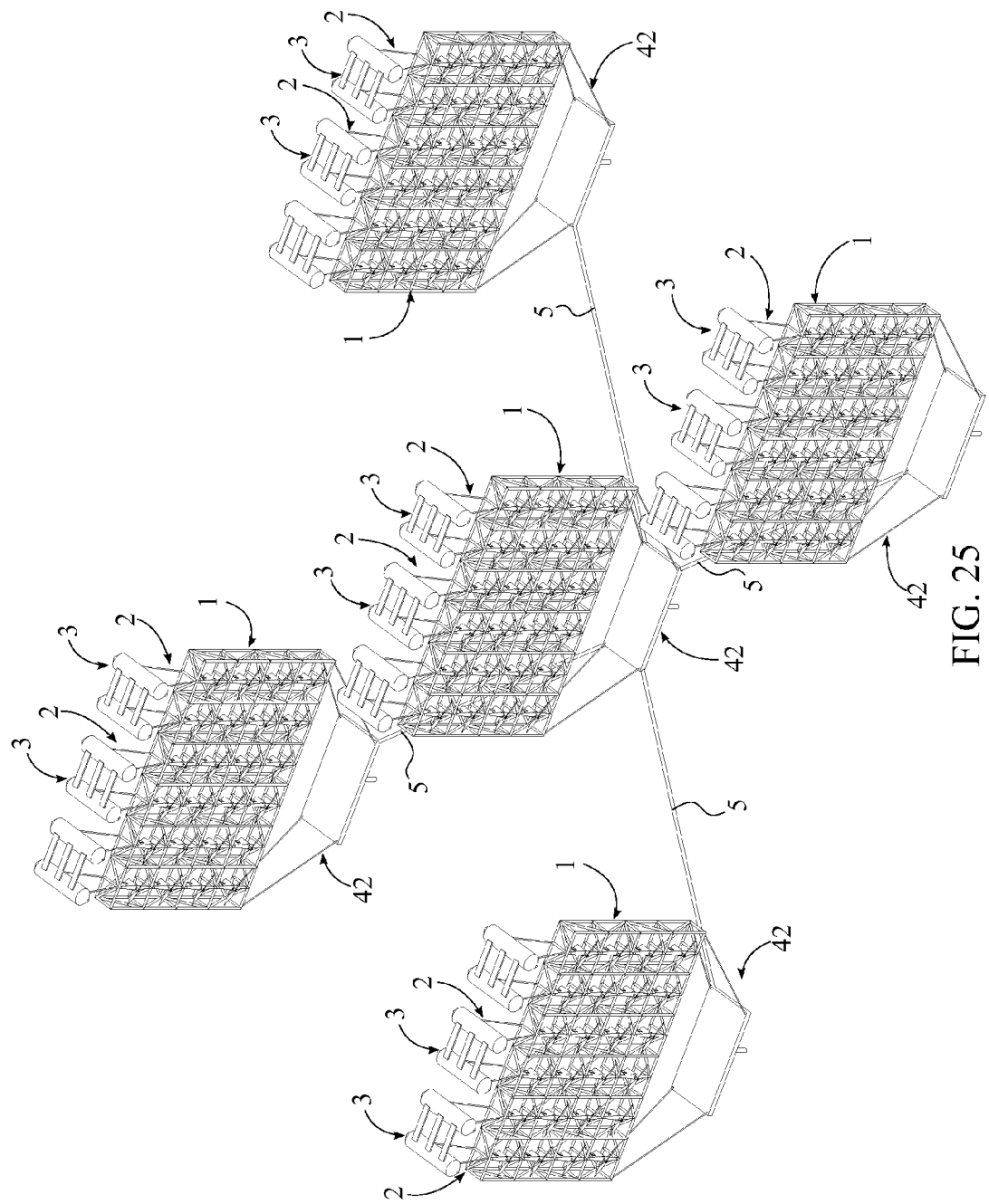
FIG. 25 is a perspective view of the power farm of the present invention, showing the horizontal mooring system and the high depth attachment system.
Figure 26:
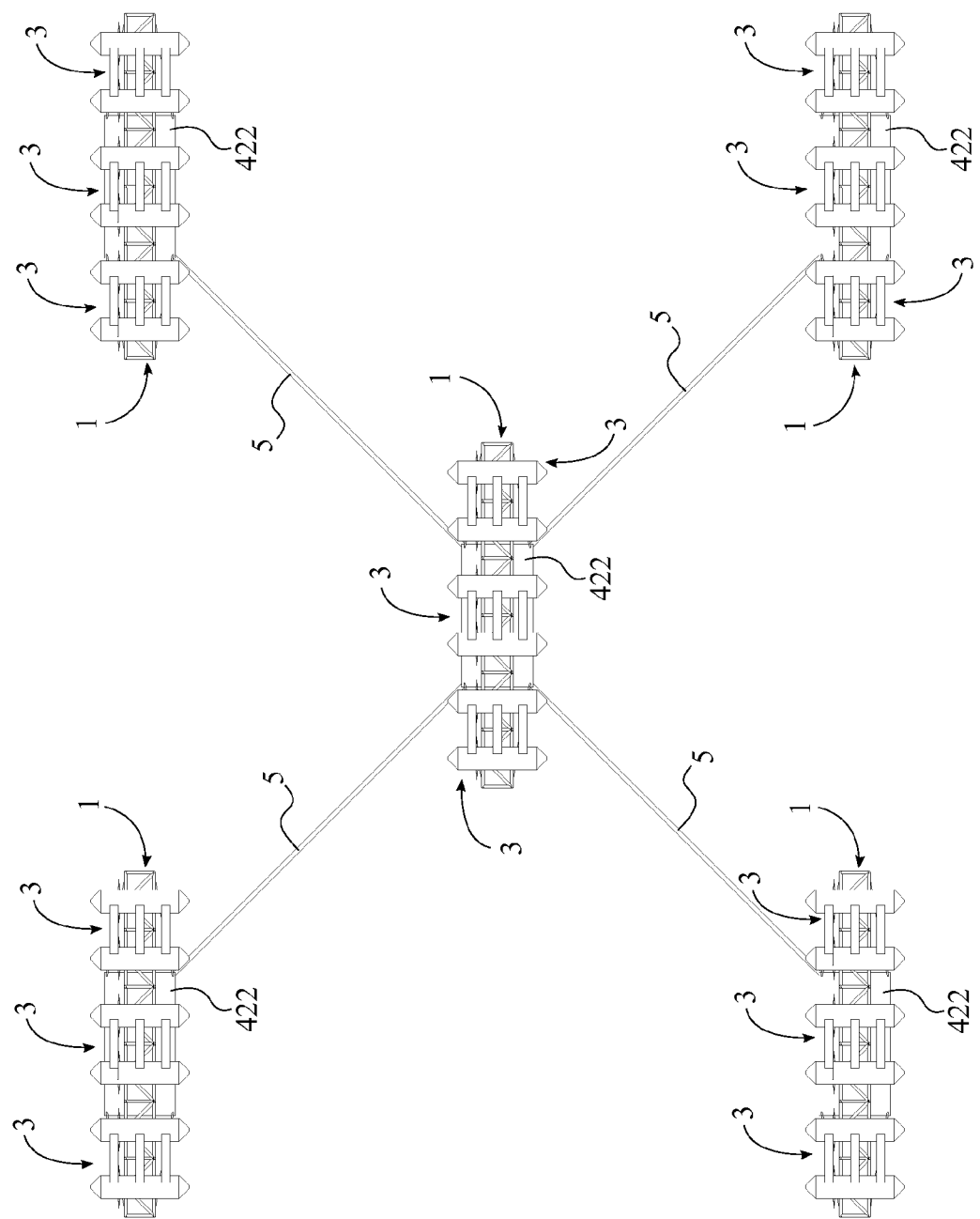
FIG. 26 is a top view of the power farm of the present invention, showing the horizontal mooring system and the high depth attachment system.

In reference to FIG. 23-FIG. 26, when a plurality of hydroelectric generating units are configured together to capitalize on large amount of marine currents and marine waves for substantial power generation as a power farm, a horizontal mooring system 5 is used within each of the plurality of hydroelectric units for additional stability and strength of the whole system. The plurality of hydroelectric generating units comprises an arbitrary hydroelectric generating unit and surrounding hydroelectric generating units, where the surrounding hydroelectric generating units are radially positioned around the arbitrary hydroelectric generating unit. Since the horizontal mooring system 5 is positioned in between each of the plurality of hydroelectric generating units, the surrounding hydroelectric generating units are laterally connected with the arbitrary hydroelectric generating unit through the horizontal mooring system 5. As shown in FIG. 23 and FIG. 24, if the plurality of hydroelectric generating units implements the low depth attachment system 41, the buoyant floating frames 1 of the surrounding hydroelectric generating units are laterally connected with the buoyant floating frame 1 of the arbitrary hydroelectric generating unit through the horizontal mooring system 5. The horizontal mooring system 5 preferably positioned adjacent with the top section 16 of the buoyant floating frame 1 as the positioning of the horizontal mooring system 5 reduces the inclination angle of the submerged buoyant floating frame 1. As show in FIG. 25 and FIG. 26, if the plurality of hydroelectric generating units implements the high depth attachment system 42, the sea anchors 422 of the surrounding hydroelectric generating units are laterally connected with the sea anchor 422 of the arbitrary hydroelectric generating unit through the horizontal mooring system 5. The seabed tension mooring legs 411 and the at least one sea anchor mooring leg 423 prevents the drift of the arbitrary hydroelectric generating unit and the surrounding hydroelectric generating units.

By connecting the surrounding hydroelectric generating units with the arbitrary hydroelectric generating unit, the wave force of the marine waves are distributed among the buoyant floating frames 1 of each of the plurality of hydroelectric generating units so that no individual frame must take the brunt of the wave load on its own. Frame installation vessels can use the horizontal mooring system 5 to install the buoyant floating frames 1 and thus avoid the cost, time and risks associated with installing a temporary mooring system for the buoyant floating frames 1 installation. In addition, the horizontal lateral mooring system 5 aids in reducing the seabed area required for the power farm by reducing the distance between the buoyant floating frames 1 and the seabed 10. Another benefit of the horizontal lateral mooring system 5 is that it assists in maintaining the orientation of the buoyant floating frames 1 near vertical position so that the marine current electric generator units 112 operate at near their maximum efficiency.

Since the marine current electric generator units 112 produce more power by having the rotors 116 spin faster and higher velocity currents make the rotors 116 spin faster, the ideal location for the placement of the power farm which utilizes the marine current electric generator units 112 and the buoyant floating frames 1 should be a locations of high velocity marine currents. Locations of high velocity marine currents can often be found between land masses. The buoyant floating frames 1 may also be installed in any other areas like the open oceans, barring legal or international restrictions. The speed of the marine currents that flows across the blades 117 can also be further increased by the use of shrouds.

Although the invention has been explained in relation to its preferred embodiment, it is to be understood that many other possible modifications and variations can be made without departing from the spirit and scope of the invention as hereinafter claimed.

What is claimed is:

1. A hydroelectricity generating unit capturing marine wave energy and marine current energy comprises:
    a buoyant floating frame;
    a plurality of electric generator pontoons;
    a floating frame mooring system;
    the buoyant floating frame comprises a plurality of structures, a front face, a rear face, a top surface, and a bottom surface;
    each of the plurality of structures comprises a pair of connecting sleeves and a marine current electric generator unit;
    the plurality of structures being linearly positioned within the buoyant floating frame;
    the pair of connecting sleeves being permanently connected within each of the plurality of structures;
    the marine current electric generator unit being centrally connected with the pair of connecting sleeves within each of the plurality of structures;
    the plurality of electric generator pontoons being connected with the buoyant floating frame by a plurality of pontoon mooring system;
    the buoyant floating frame being connected with a seabed by the floating frame mooring system;
    the floating frame mooring system being a low depth attachment system:
    the low depth attachment system comprises seabed tension mooring legs; and
    the seabed tension mooring legs being connected with the seabed and the bottom surface.

2. The hydroelectricity generating unit capturing marine wave energy and marine current energy as claimed in claim 1 comprises:
    the front face and the rear face being oppositely positioned from each other on the plurality of structures of the buoyant floating frame;
    the top surface being perpendicularly positioned in between the front face and the rear face; and
    the bottom surface being perpendicularly positioned in between the front face and the rear face opposite from the top surface.

3. The hydroelectricity generating unit capturing marine wave energy and marine current energy as claimed in claim 2 comprises:
    the buoyant floating frame being a rectangular shaped frame;
    the rectangular shaped frame comprises a top section and a bottom section;
    the top section being positioned atop the bottom section;
    length dimensions of the top section and the bottom section being equal to each other;
    the front face of the top section and the bottom section being linearly positioned with each other; and
    the rear face of the top section and the bottom section being linearly positioned with each other.

4. The hydroelectricity generating unit capturing marine wave energy and marine current energy as claimed in claim 2 comprises:
    the buoyant floating frame being a tapered rectangular shaped frame;
    the tapered rectangular shaped frame comprises a top section and a bottom section;
    the top section being positioned atop the bottom section;
    length dimensions of the top section being larger than the bottom section;
    the front face of the top section and the bottom section being linearly positioned with each other; and
    the rear face of the top section and the bottom section being linearly positioned with each other.

5. The hydroelectricity generating unit capturing marine wave energy and marine current energy as claimed in claim 2 comprises:
    the buoyant floating frame being a slanted rectangular shaped frame;
    the slanted rectangular shaped frame comprises a top section, a middle section, and a bottom section;
    the middle section being positioned in between the top section and the bottom section;
    the top section and the bottom section being offset from each other;
    length dimensions of the top section, the middle section, and the bottom section being equal to each other;
    the rear face of the top section being perpendicularly positioned with the top surface;
    the front face of the bottom section being perpendicularly positioned with the bottom surface;
    the front face of the top section and the middle section being linearly positioned with each other in between the top surface and the front face of the bottom section; and
    the rear face of the bottom section and the middle section being linearly positioned with each other in between the bottom surface and the rear face of the top section.

6. The hydroelectricity generating unit capturing marine wave energy and marine current energy as claimed in claim 1 comprises:

the marine current electric generator unit comprises a compartment casing, a stator generator, a directional fin, a rotor, blades, and a yaw mechanism;

the stator generator being positioned within the compartment casing;

the directional fin being connected on the compartment casing;

the directional fin being perpendicularly positioned with the top surface;

the compartment casing being perpendicularly connected with the yaw mechanism;

the rotor being rotatably connected with the stator generator;

the rotor is traversed through the yaw mechanism and into the compartment casing opposite from the directional fin;

the blades being radially connected around the rotor;

the blades being adjacently positioned with the yaw mechanism; and the yaw mechanism being rotatably connected within the pair of connecting sleeves.

7. The hydroelectricity generating unit capturing marine wave energy and marine current energy as claimed in claim 1 comprises:

the plurality of electric generator pontoons being single pontoon units;

each of the single pontoon units comprises a floating body and a wave electric generator;

the wave electric generator being centrally positioned within the floating body;

the wave electric generator comprises a stator electric generator, a first rotor, and a second rotor;

the first rotor and the second rotor being rotatably connected with the stator electric generator;

the stator electric generator being positioned in between the first rotor and the second rotor;

the plurality of pontoon mooring system comprises a first connecting element and a second connecting element;

the first connecting element being connected with the first rotor and the top surface;

the second connecting element being connected with the second rotor and the top surface; and the first connecting element and the second connecting element being traversed through the floating body.

8. The hydroelectricity generating unit capturing marine wave energy and marine current energy as claimed in claim 1 comprises:

the plurality of electric generator pontoons being double pontoon units;

each of the double pontoon units comprises a first pontoon and a second pontoon;

the first pontoon and the second pontoon being connected parallel to each other;

the first pontoon being linearly and oppositely positioned with the second pontoon;

the first pontoon and the second pontoon each comprise a floating body and a wave electric generator;

the wave electric generator being centrally positioned within the floating body;

the wave electric generator comprises a stator electric generator, a first rotor, and a second rotor;

the first rotor and the second rotor being rotatably connected with the stator electric generator;

the stator electric generator being positioned in between the first rotor and the second rotor for;

the plurality of pontoon mooring system comprises a first connecting element and a second connecting element for the first pontoon and the second pontoon;

the first connecting element of the first pontoon being connected with the first rotor of the first pontoon and the top surface;

the second connecting element of the first pontoon being connected with the second rotor of the first pontoon and the top surface;

the first connecting element and the second connecting element of the first pontoon being traversed through the floating body;

the first connecting element of the second pontoon being connected with the first rotor of the second pontoon and the top surface;

the second connecting element of the second pontoon being connected with the second rotor of the second pontoon and the top surface; and the first connecting element and the second connecting element of the second pontoon being traversed through the floating body.

9. The hydroelectricity generating unit capturing marine wave energy and marine current energy as claimed in claim 1 comprises:

the plurality of electric generator pontoons being double pontoon units;

each of the double pontoon units comprises a first pontoon, a second pontoon, a first marine current electric generator, and a second marine current electric generator;

the first pontoon and the second pontoon being connected parallel to each other;

the first pontoon being linearly and oppositely positioned with the second pontoon;

the first marine current electric generator and the second marine current electric generator being perpendicularly connected with the first pontoon and the second pontoon;

the first marine current electric generator and the second marine current electric generator being oppositely positioned from each other along the first pontoon and the second pontoon;

the first pontoon and the second pontoon each comprise a floating body and a wave electric generator;

the wave electric generator being centrally positioned within the floating body;

the wave electric generator comprises a stator electric generator, a first rotor, and a second rotor;

the first rotor and the second rotor being rotatably connected with the stator electric generator;

the stator electric generator being positioned in between the first rotor and the second rotor for;

the plurality of pontoon mooring system comprises a first connecting element and a second connecting element for the first pontoon and the second pontoon;

the first connecting element of the first pontoon being connected with the first rotor of the first pontoon and the top surface;

the second connecting element of the first pontoon being connected with the second rotor of the first pontoon and the top surface;

the first connecting element and the second connecting element of the first pontoon being traversed through the floating body;

the first connecting element of the second pontoon being connected with the first rotor of the second pontoon and the top surface;

the second connecting element of the second pontoon being connected with the second rotor of the second pontoon and the top surface; and the first connecting element and the second connecting element of the second pontoon being traversed through the floating body.

10. A power farm system for capturing marine wave energy and marine current energy comprises:
   a plurality of hydroelectric generating units, wherein the plurality of hydroelectric generating units uses wave energy and current energy of water to generate electricity;
   a horizontal mooring system;
   each of the plurality of hydroelectric generating units comprises a buoyant floating frame, a plurality of pontoon mooring system, a plurality of electric generating pontoons, and a floating frame mooring system;
   the plurality of electric generator pontoons being connected with the buoyant floating frame by the plurality of pontoon mooring system;
   the buoyant floating frame being connected with a seabed by the floating frame mooring system;
   the plurality of hydroelectric generating units comprises an arbitrary hydroelectric generating unit and surrounding hydroelectric generating units;
   the surrounding hydroelectric generating units being radially positioned around the arbitrary hydroelectric generating unit; and
   the surrounding hydroelectric generating units being laterally connected with the arbitrary hydroelectric generating unit through the horizontal mooring system.

11. The power farm system for capturing marine wave energy and marine current energy as claimed in claim 10 comprises:
   the floating frame mooring system being a low depth attachment system;
   the low depth attachment system comprises seabed tension mooring legs;
   the seabed tension mooring legs being connected with the seabed and the bottom surface; and
   the buoyant floating frame of the surrounding hydroelectric generating units being laterally connected with the buoyant floating frame of the arbitrary hydroelectric generating unit through the horizontal mooring system.

12. The power farm system for capturing marine wave energy and marine current energy as claimed in claim 10 comprises:
   the floating frame mooring system being a high depth attachment system;
   the high depth attachment system comprises a plurality of frame connecting legs, a sea anchor, and at least one sea anchor mooring leg;
   the plurality of frame connecting legs being connected with the sea anchor and the bottom surface;
   the at least one sea anchor mooring leg being connecting with the sea anchor and the seabed; and
   the sea anchor of the surrounding hydroelectric generating units being laterally connected with the sea anchor of the arbitrary hydroelectric generating unit through the horizontal mooring system.

* * * * *